(12) United States Patent
Shteynberg et al.

(10) Patent No.: US 6,294,777 B1
(45) Date of Patent: Sep. 25, 2001

(54) MODULAR ARTICULATED LIGHT CURTAIN

(75) Inventors: Boris Shteynberg, San Francisco; James A. Ashford, Portola Valley, both of CA (US)

(73) Assignee: Scientific Technologies Incorporated, Fremont, CA (US)

(*) Notice: Subject to any disclaimer, the term of this patent is extended or adjusted under 35 U.S.C. 154(b) by 0 days.

(21) Appl. No.: 09/626,098

(22) Filed: Jul. 26, 2000

Related U.S. Application Data

(63) Continuation of application No. 09/523,406, filed on Mar. 10, 2000.
(60) Provisional application No. 60/123,994, filed on Mar. 11, 1999.

(51) Int. Cl.[7] .................................................. G01V 9/04
(52) U.S. Cl. .................... 250/221; 250/222.1; 340/555
(58) Field of Search ............................... 250/221, 222.1; 340/555–557

(56) References Cited

U.S. PATENT DOCUMENTS

| | | |
|---|---|---|
| 3,805,061 | 4/1974 | De Missimy et al. ............... 250/209 |
| 4,249,074 | 2/1981 | Zettler et al. ........................ 250/221 |
| 4,737,632 | 4/1988 | Kawabe et al. ................... 250/221.2 |
| 4,958,068 | 9/1990 | Pong et al. ........................ 250/222.1 |
| 5,003,169 | 3/1991 | Sakaguchi et al. ................. 250/221 |
| 5,198,661 | 3/1993 | Anderson et al. .................... 250/221 |
| 5,281,809 * | 1/1994 | Anderson et al. .................... 250/221 |
| 5,302,942 * | 4/1994 | Blau .................................... 340/556 |
| 5,672,884 | 9/1997 | Mühleck et al. ..................... 250/551 |

\* cited by examiner

Primary Examiner—Stephone B. Allen
(74) Attorney, Agent, or Firm—Coats & Bennett, P.L.L.C.

(57) ABSTRACT

A modular articulated light curtain is formed by combining straight, curved, or angled modules with straight or angled couplers. Modules include an array of pitched light emitters or light detectors, and have rounded distal ends that mate, mechanically and electrically, with each other or with a coupler. Interconnection of adjacent modules is such that a constant pitch of light emitters or light detectors is maintained. The light curtain comprises an assembly of interconnected light emitting modules spaced-apart from interconnected light detecting modules. One end of each assembly is terminated, while the other assembly end has a cable end module that may include at least one light emitter or detector, and may include a visual indicator, and provides input/output electrical interface to the light curtain.

26 Claims, 24 Drawing Sheets

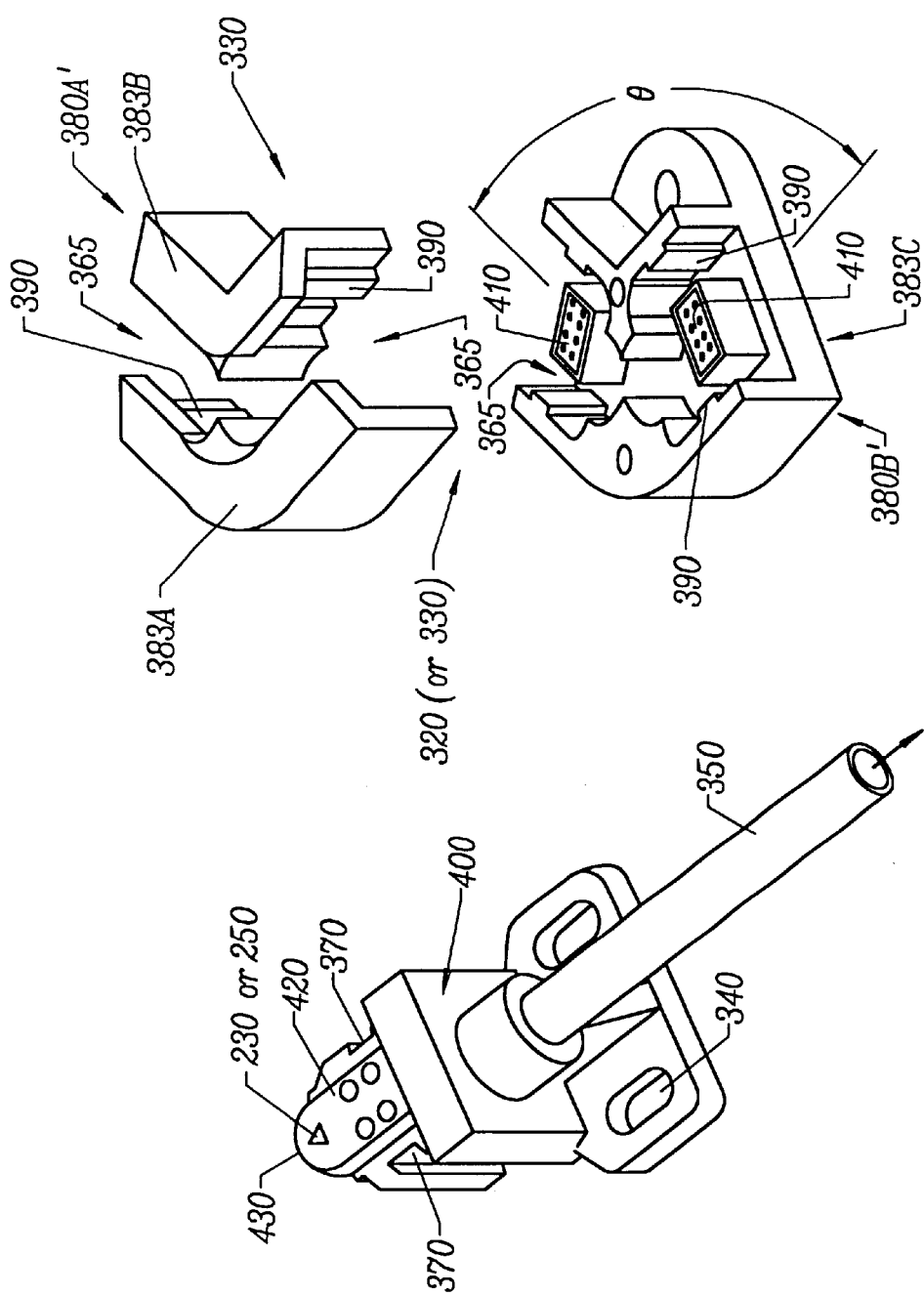

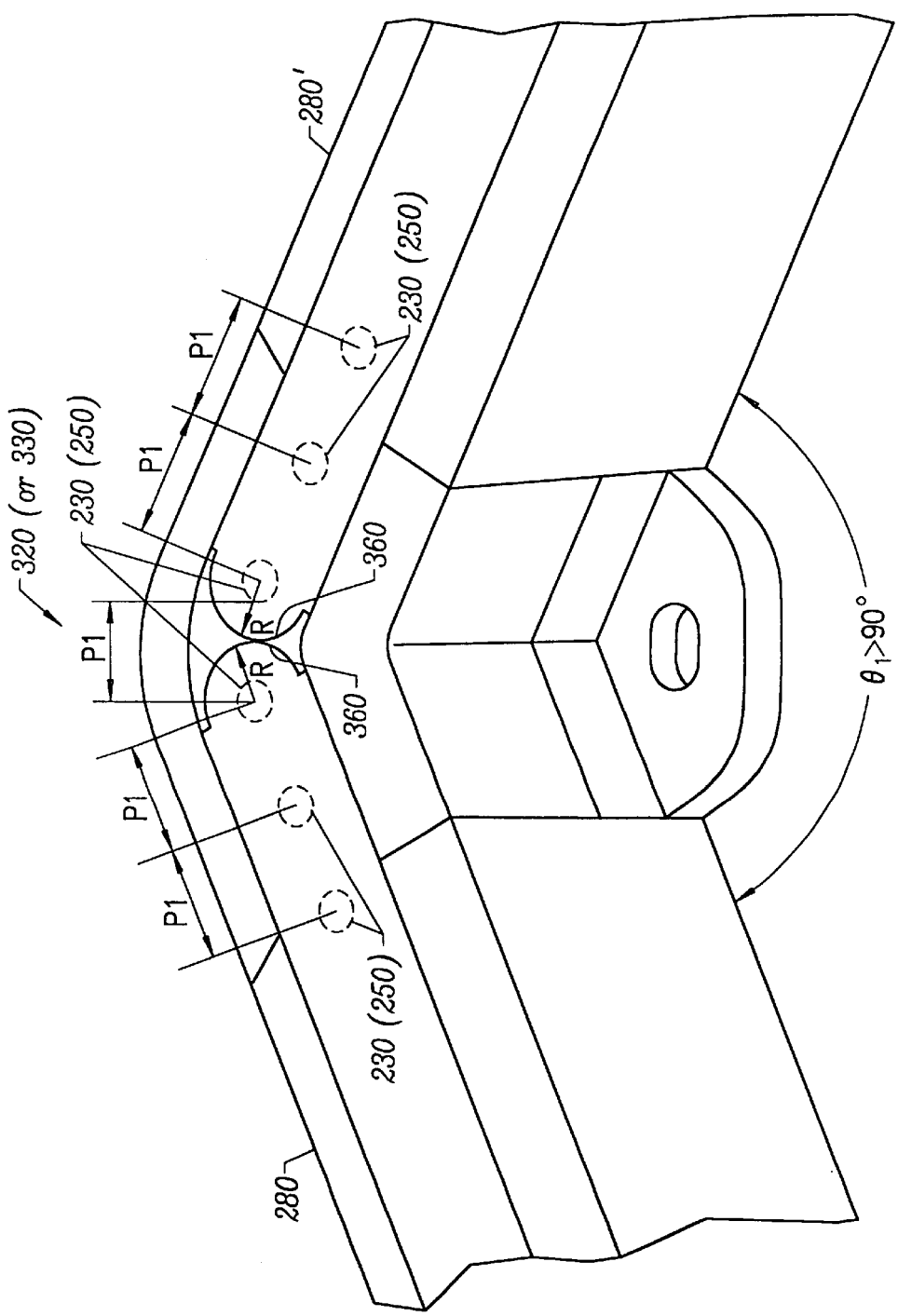

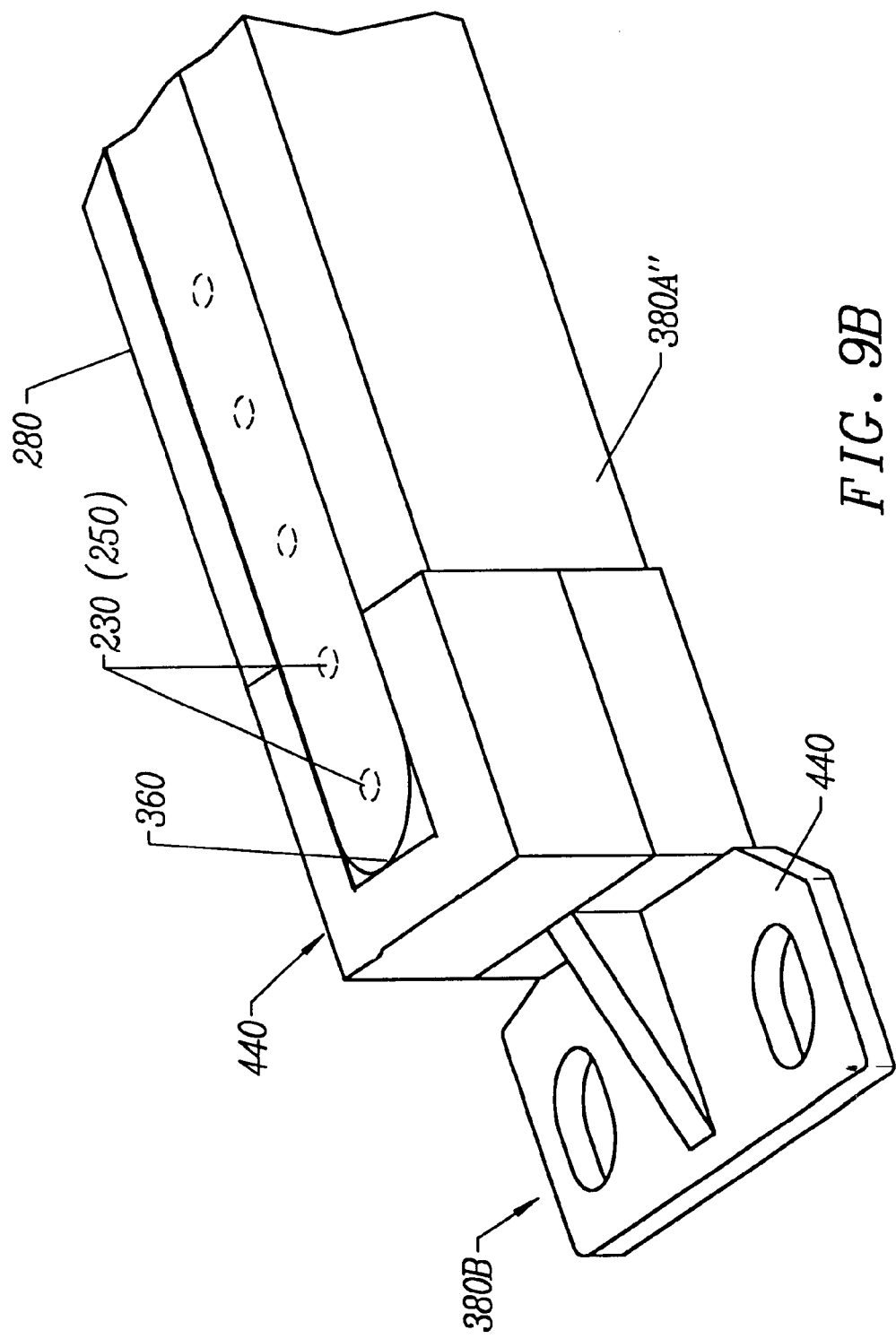

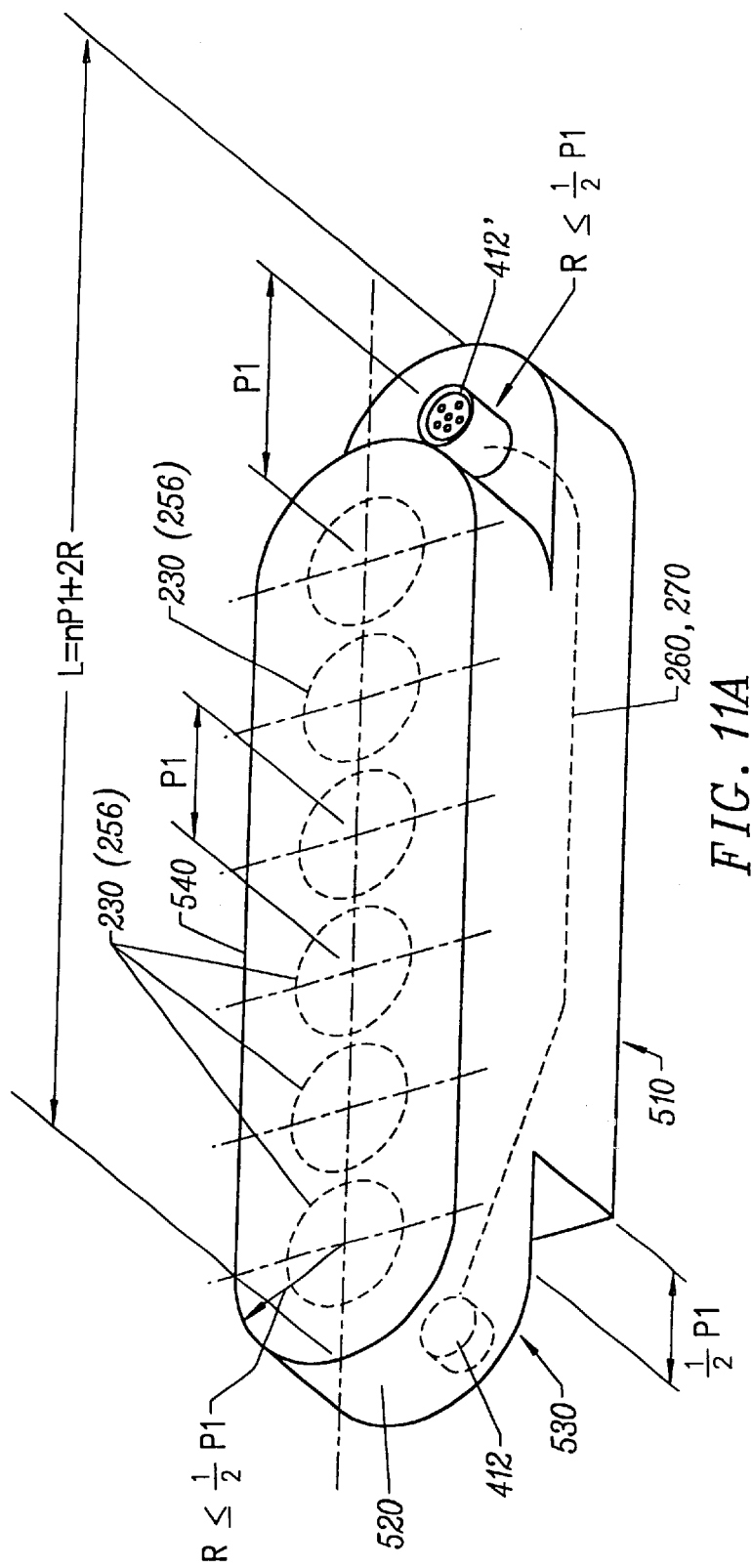

MODULAR ARTICULATED LIGHT CURTAIN

RELATION TO EARLIER FILED APPLICATION

This application is a continuation of 09/523,406 filed Mar. 10, 2000 which priority is claimed from U.S. provisional patent application serial No. 60/123,994 filed on Mar. 11, 1999.

FIELD OF THE INVENTION

This invention relates generally to protective devices such as light curtains and more particularly to providing a modular articulated light curtain whose elements may be retained at user selected angles, while retaining light beam resolution through the angles.

BACKGROUND OF THE INVENTION

Light curtains are commonly used to protect hazardous areas from intruding persons or objects. For example, a particular piece of machinery may be dangerous to humans who come too close. By mounting a protective screen of so-called light curtains at the periphery of the danger zone, the presence of an intruding object or portion of a person can be detected. Detection can be used to signal an alarm, turn off the machinery, among other functions.

Light curtains are spaced-apart light emitters and light detectors. Depending upon the application, the spaced-apart distance may range from perhaps 20 cm to perhaps 6 m or more. Absent an intruding object, the light emitting portion of the light curtain emits light that passes through empty space to be detected by the light detecting portion of the curtain. However the presence of an object will block transmission of some of the light, causing the light receiving portion to output a warning signal or command. Typically the lights are turned-on in a series sequence, one at a time. FIG. 1 depicts a piece of machinery 10 to whose front edge 20 there is mounted the light receiving unit 30 of a light curtain 40, and at whose base 50 there is mounted the light emitting unit 60 of light curtain 40, according to the prior art. As indicated in FIG. 1, the light emitting and light receiving units are coupled to electronics 70, 80, not shown here.

The emitted light 90 traverses the region or zone 100 to be protected. If the protected zone is regarded as a plane defined by an array of light emitters and an array of light detectors, each array disposed in parallel straight lines, as shown in FIG. 1, standard prior art light curtain devices 40 may be used. However when the protected region 100 involves angles and bends, it is difficult to provide a light curtain without modifying existing components. For example, it typically becomes necessary to stack portions of the light emitters on more than one plane, and to stack portions of the light detecting units on more than one plane. For example, it is desirable to maintain light beam resolution through such angles or bends, yet this design goal is not readily met in the prior art and resolution is degraded in attempting to protect curved or angular regions.

Thus there is a need for a preferably modular articulated light curtain. Preferably such light curtain should maintain light beam spacing throughout, or give the option to intentionally alter beam spacing at desired regions. Such light curtain should permit the user to shape it into desired angles, for example a zig-zag shape, and to retain the light curtain in such configuration to accommodate differently shaped regions to be protected. As noted, light beam spacing should be preserved though the desired angles. Preferably such light curtain should provide modular light emitting units and modular light detecting units, which individual modules are on a single plane, regardless of the angular configuration. As such, one pair of a light emitting module and a light receiving module will preferably be parallel to each other but can tolerate error in planarity, for example ±12°.

The present invention provides such a light curtain.

SUMMARY OF THE INVENTION

In a first embodiment, the present invention provides modules that are joined at a module end with a coupler. A module may be straight, curved, or angled, and will have rounded distal ends, and will include light emitters or light detectors. By contrast, couplers do not include light emitters or light detectors (generically termed herein as light units), can be straight or angled, and have an interior region sized to receive the rounded distal end of an adjacent module. Modules and couplers each include electrical connectors that can matingly engage from a module to a coupler. Within a light emitting module or within a light detecting module, it is preferred that adjacent light emitters or adjacent light detectors, respectively, are spaced-apart from each other with a desired pitch.

As used herein, "light unit" will be understood to refer to a light emitter or to a light detector. Thus a module may generically be considered as having an array of light units spaced-apart from each other a desired pitch. If the light units are light emitters the module is a light emitting module, and if the light units are light detectors, the module will be referred to as a light detecting module. Each module also includes at least one electrical wire or trace coupled to the light emitters or to the light detectors within the module. Couplers maintain electrical continuity between adjacent modules such that electrical signals can be carried across the length of a connected series of modules and couplers. Further, couplers can maintain the desired pitch between adjacent light emitters or adjacent light detectors in adjacent modules. The two distal ends of a series of modules and couplers are terminated with appropriate terminating units. One unit provides electrical termination to the series, will typically not include any light emitters or detectors and can be regarded as a special form of coupler. The other terminating unit brings electrical leads and signals to and from the series, and may include at least one light emitter or detector, and can be regarded as a special form of module.

By way of example, a portion of a light curtain intended to protect two adjacent straight regions having lengths L1, L2, joined at an angle of θ could be implemented as a first straight module of length L1, an angled coupler defining the desired angle θ, and a second module of length L2. If, for example, L1 were longer than a standard length module, the L1 length might be implemented using several shorter length straight modules each having length L3, joined together with straight couplers, such that the several L3 length modules added up to the desired overall length L1.

The light curtain is defined by a plane that is itself defined by the locus of the light emitting module(s) and the light emitting coupler(s). It is understood that the light emitting modules are spaced apart but parallel to light detecting module(s), such that the locus of the light emitting modules and the locus of the light detecting module are the same. The spaced-apart distance between light emitting and light receiving modules may, but need not be, vertical in orientation and can vary from perhaps 0.25 M to 30 M or even larger. Non-planarity between a spaced-apart light emitter in a module and a corresponding light detector in a module can be tolerated within limits, for example ±12°.

When detection of emitted light by a corresponding light detector is interrupted, for example by an object intruding in the protected region, an electronic signal carried by the wire or trace in the module/coupler will manifest this interruption. The wire/trace is coupled to conventional electronic drive and detection circuitry that can utilize the signal to identify an intrusion. Such circuitry can, for example, be used to shut down protected machinery, sound an alarm, etc.

An alternative embodiment of the present invention provides modules that pivotally interlock with each other such that a desired angular offset between adjacent modules in the light curtain is readily achieved. As such, the modules interlock directly with each other without requiring an intervening coupler. The modules have rounded distal ends whose radius $R \leq P1/2$, where P1 is the pitch of adjacent light units (e.g., light emitters or adjacent light detectors P on the module. The distal end to distal end distance L of the modules is (n+1)P1, where n is the number of light emitters or light detectors on the module. Pivoting electrical connectors at the rounded distal end of such modules mate to provide electrical continuity and mechanical stability to the resultant light emitting system or light detecting system. A light emitting system so configured may be used in lieu of conventional ceiling or wall track lighting.

A further embodiment enables angled orientation of the light curtain by using conventional light emitter and detector modules connected by couplers which can be easily assembled and disassembled using standard tools, and reassembled with corner blocks replaced to provide a different angled orientation as required for a particular end-use application. The coupler assemblies comprise a base plate, corner block and cover.

Other features and advantages of the invention will appear from the following description in which the preferred embodiments have been set forth in detail, in conjunction with the accompanying drawings.

DETAILED DESCRIPTION OF THE INVENTION

FIG. 5 is a detailed perspective view of a cable end module or terminating unit with optional light unit(s), according to the present invention;

FIG. 6 is a detailed exploded view of an embodiment of an angled coupler implemented with upper and lower members, according to the present invention;

FIG. 7B is a perspective view of a portion of a light curtain depicting adjacent straight modules joined by a 135° angled coupler that preserved optical beam resolution through the obtuse angle, according to the present invention;

FIG. 9B is a perspective view depicting the interface between a straight module and a terminating end, according to the present invention;

FIG. 11A is a perspective view of a main straight module useable without a separate intervening coupler, according to a second embodiment of the present invention;

DETAILED DESCRIPTION OF THE PREFERRED EMBODIMENTS

Figure 2:
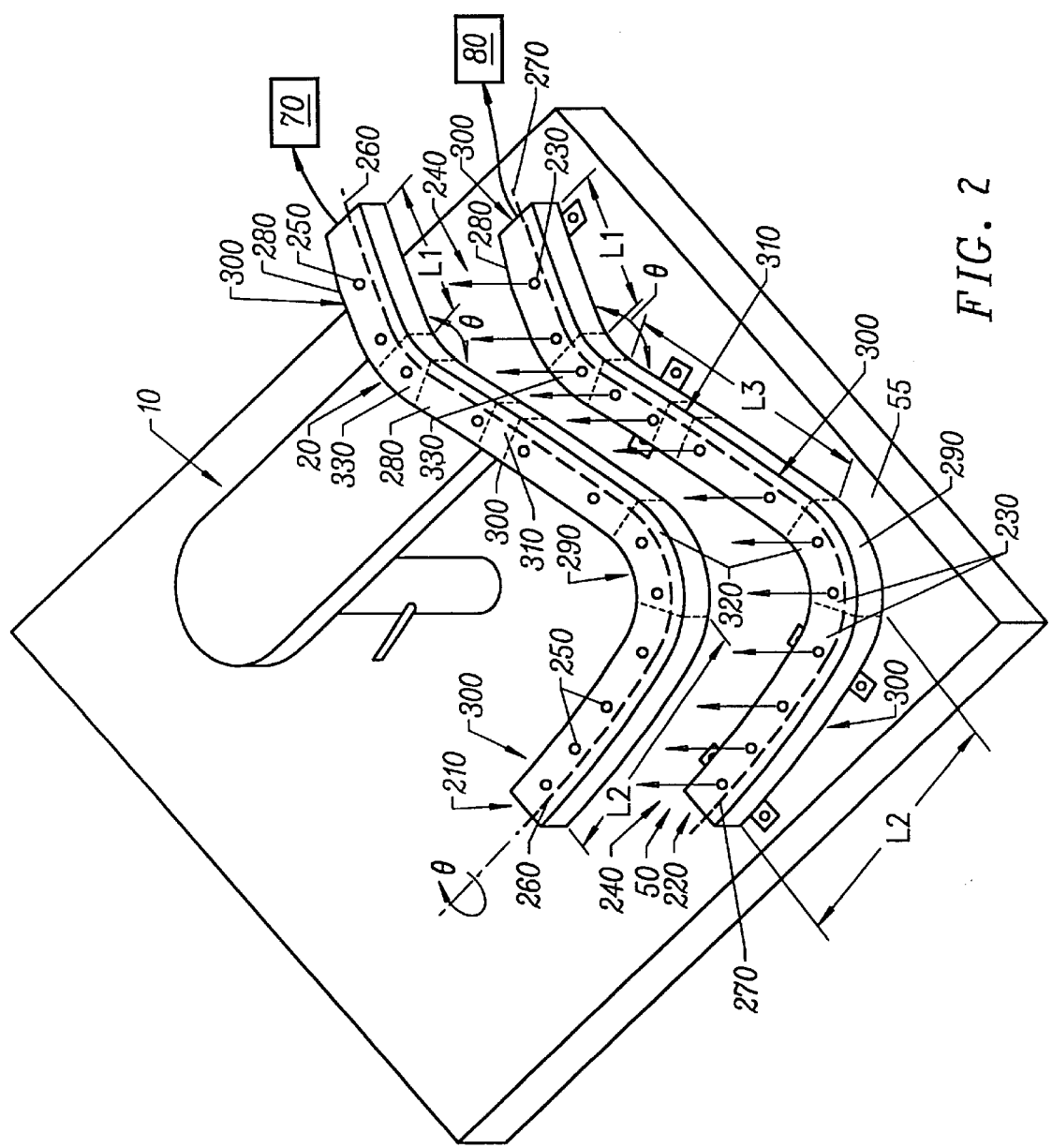
FIG. 2 depicts a non-straight zone adjacent a piece of machinery protected with an articulated modular light curtain that includes straight and curved modules, and straight and angled couplers, according to the present invention.

FIG. 2 is a perspective view of a generic light curtain system 200, according to the present invention, used to protect machinery 10 or other region requiring protection. System 200 may be described as comprising modules (straight, curved, or angled) that include light units (e.g., light emitters or light detectors) spaced-apart from other light units with a desired pitch or granularity (e.g., so many light units per unit length). System 200 further include couplers (straight or angled) that join adjacent modules, and also includes terminating units disposed at the end of a series of modules and couplers.

Affixed adjacent the front region 20 of machinery 10 is a light detecting system 210, and disposed near front region 50 of a work surface 55 (or equivalent) there is a spaced-apart light emitting system 220 mounted in a preferably parallel or near parallel orientation. Light emitting system 220 includes a plurality of light emitters 230 spaced-apart from each other with a desired pitch or granularity, e.g., so many light emitters per unit length. As will be described, the light emitters 230 are disposed in modules and, if required, in a cable end termination module.

Emitters 230 emit a curtain of light 240 that is detected (in the absence of an intervening object) by light detectors 250 in modules and, if required, in a cable end termination module, in detector system 210. The spaced-apart pitch of adjacent detectors 250 preferably is identical to the pitch of light emitters 230. When implemented with components available at the present time, pitch distances (P1) may be on the order of perhaps 3 mm to 50 mm or larger. The plane of the locus defined by light emitter system 220 will be parallel to the plane defined by light detector system 210, although between a given light emitter and its corresponding light detector (e.g., the detector that will receive light from that emitter), non-planarity is tolerated such that angle φ may be about ±12°, e.g., a relative mis-match in planarity with about ±12° is acceptable. The spaced-apart distance between the light emitting system 220 and the light receiving system 210 may be about 0.25 M to about 30 M, depending upon the application. As in the embodiment of FIG. 1, electronics 70, 80 is coupled via at least one electrical lead 260, 270 within or on systems 210, 220. When an object interrupts light curtain 240, signal(s) carried by these leads to electronics 70, 80 may be used to shutdown machinery 10, to sound an alarm, etc.

Figure 1:
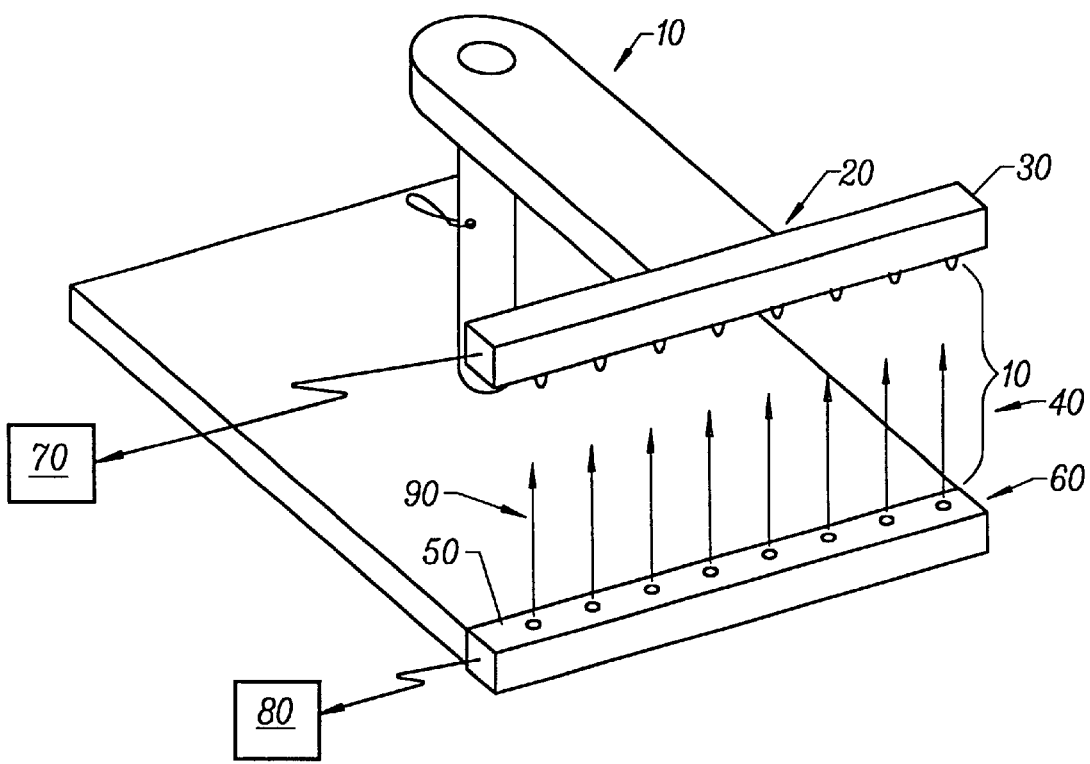
FIG. 1 depicts a straight zone adjacent a piece of machinery protected with a conventional light curtain, according to the prior art.

In comparing FIGS. 1 and 2, it is seen from FIG. 1 that the present invention provides a light curtain that can include straight regions 280 that may be joined at an angle θ, and can include curved regions 290. As noted, the pitch of adjacent light emitter units 230 or of adjacent light detector units 250 preferably is held constant through the straight, angular, and curved module regions that define the shape or locus of the light curtain. If desired, however, different regions could have different pitches (e.g., correspondingly different pitches for the same light emitter region and light detector region) by using modules with correspondingly differently pitched light units.

As will be described, system 200 is modular in that a desired light curtain path or locus can be implemented by combining modules (straight, angled, or curved) together with couplers (straight or angled). In FIG. 2, as will be described, straight region 300 may be implemented by linking adjacent straight modules with a straight coupler if length L2 is not available using a standard length straight module. Curved region 320 may be implemented using curved modules, and angled region 330 may be implemented using angled modules or by combining adjacent straight modules with an intervening angled coupler that may have been manufactured with the desired fixed angular offset θ.

It will be appreciated that the terms light emitter and light detector may be interchangeable. Thus, whereas FIG. 2 depicts the overall light emitter system as mounted to a work surface 55 and the overall light detector system as mounted to machinery 10, one could instead replace the light emitter system with the light detector system and vice versa. Further plane of the light curtain in FIG. 2 could be other than vertical, for example by orienting the light emitting and light detecting systems in other than a relative vertical offset position.

Figure 3:
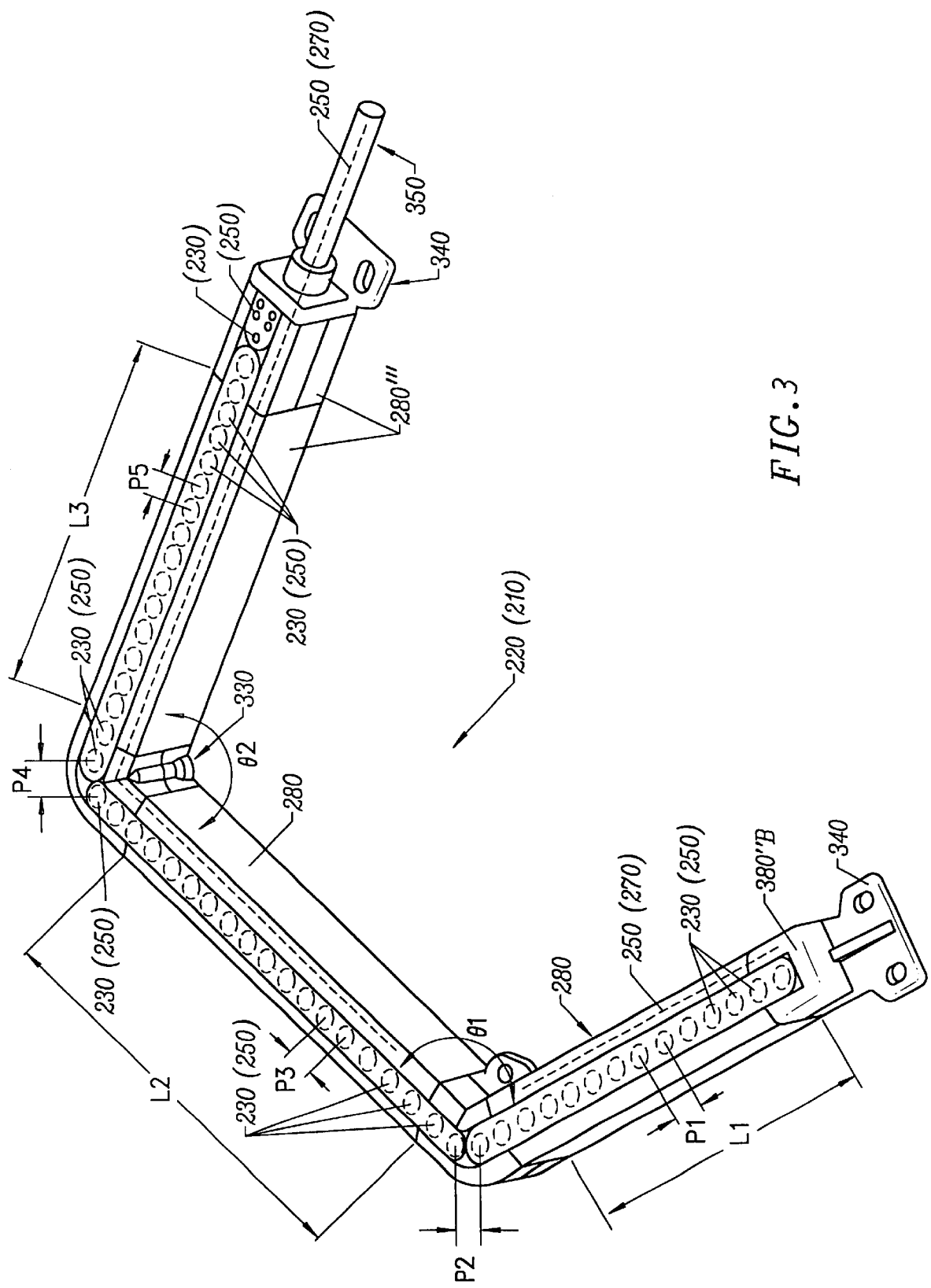
FIG. 3 is a perspective view of an exemplary articulated modular light curtain light emitter or light detector system comprising straight modules, angled couplers, a terminating unit, and a cable end module, according to the present invention.

FIG. 3 will be described as though the modular articulated system shown is the light emitting system 220 of a light curtain according to the present invention. However, as noted, the position of light emitters 230 may in fact be exchanged with light detectors 250 such that FIG. 3 is applicable to light detecting system 210.

In FIG. 3, three main straight modules 280 (having length L1), 280' (having length L2) and 280" (having length L3) are shown, where L1 may differ in length from L2 or/or L3. As shown, each module includes light emitters 230 (or light detectors 250 if FIG. 3 is understood to refer to light detector system 210). In module 280, the spaced-apart distance of pitch of adjacent emitters 230 is denoted P1, in module 280' the pitch is P3, and in module 280" the pitch is P5. Typically pitch spacing of the light emitters (or light detectors) within a main module is such as to provide object resolution according to applicable standard, for example, presently at least 14 mm object resolution. It is understood with respect to FIG. 3, that each straight module shown will include light transmitters/emitters or light receivers, depending upon whether the module is in the light emitting or light detection portion of the overall light curtain, spaced-apart with a desired pitch. Commonly light emitters 230 will be LEDs or laser emitting diodes, but other devices may instead be used. The emitted spectra for the curtain may be visible or invisible to the human eye. Shown in phantom in FIG. 3 is the at least one electrical lead or trace 250 (270) within the main modules coupled to the various light emitter units (light detector units) and to electronics 70, 80 external to what is shown in the figure.

As noted with respect to FIG. 2, the orientation between light emitting system 220 and light detecting system 210 is such that in the absence of an intervening object, at least some light emitted by system 220 will be detected by light detecting system 210. In addition to tolerating some angular offset in planarity, offset in the position of individual light emitters 230 or light detectors 250 can also be tolerated. For example, while FIG. 3 depicts the light emitters (detectors) as being in an array through which a straight line may be drawn within a straight module, the position of a given light emitter or detector could be changed by about 5 mm in any direction (including up or down) without destroying utility of the invention.

In FIG. 3 adjacent straight main modules are joined or interconnected with a coupler. Thus modules 280 and 280' are joined by an angled coupler 330, here shown defining an obtuse angle θ1. Straight modules 280' and 280" are also shown joined by an angled coupler 330, whose angle θ2 is shown as 90°. If necessary, interconnection between the straight modules could be made using a straight coupler 280'''. The various angled and straight couplers provide mechanical and electrical continuity through the light emitting and light detecting systems. Each curved coupler and each angular coupler includes light emitter(s) 230 or light detector(s) 250. The spaced-apart pitch P2, P4 associated with these couplers is preferably identical to that associated with the straight modules, e.g., P1=P2=P3=P4=P5. The result is that even though the light curtain is bent or curved, e.g., through an angle θ1 or θ2, the spaced-apart pitch of the light emitters or light detectors can remain constant. As a result, optical beam spacing (e.g., resolution) between adjacent modules can be preserved from one module, through a desired coupling angle, and into the adjacent module. As will be described, any or all of couplers 320 or 330 may define fixed angle offsets or may be user-adjustable at time of installation. Brackets such as 340 may be used to mechanically connect light emitting or detecting system 220, 210 to work surface 55, and/or to machinery 10. FIG. 3 depicts a protective sheath 350 around wires or leads 250, 270. As noted, such leads are coupled to electronics 70 and/or 80 that provide electrical power and signals to the present invention, and which can process signals output by the present invention. Such signals, when processed, can be used to identify intrusion of an object into the light curtain surrounding the region to be protected.

Figure 4:
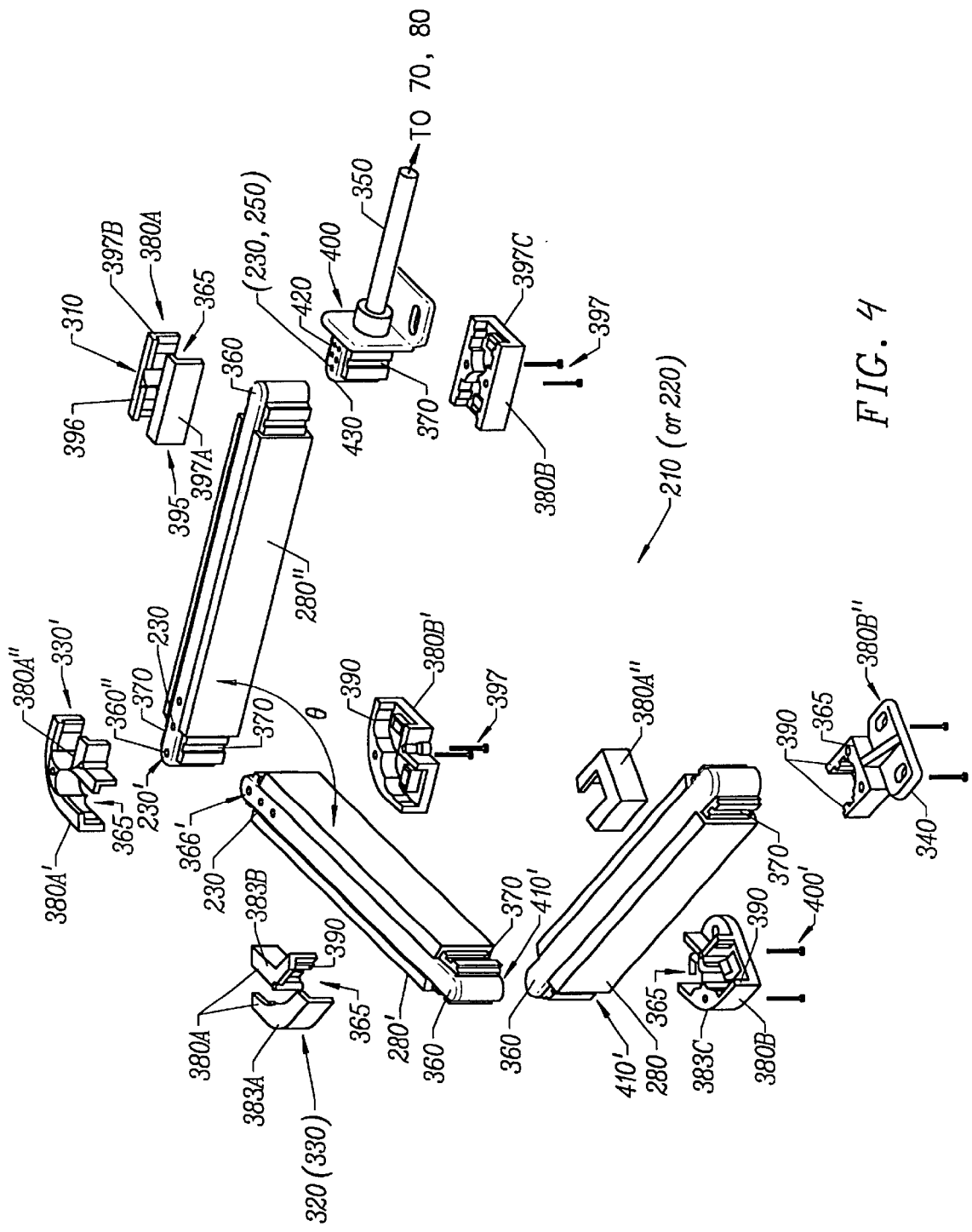
FIG. 4 is a perspective exploded view depicting straight modules, and component members of angled and straight couplers, and terminating units, according to the present invention.

The exploded view shown in FIG. 4 shows preferred implementations of straight main modules 280, 280' 280", straight coupler 310, and fixed angle couplers such as 330. Also shown are terminating unit 340, and cable end module unit 400, which optionally can include one or more light units 230, 250 Main modules may be provided in several lengths if desired, ranging from a length that includes merely one light unit (e.g., a length L1 of perhaps only 5 mm), to a more-standard length of perhaps 200 mm. As noted, preferably the rounded distal ends of main modules mechanically (and thus electrically) interlock with couplers to form a continuous light emitter system or light detector system, through which necessary electrical signals are coupled. In a preferred embodiment, distal ends of straight couplers define projecting rounded members 360 whose projection sides define at least one slot 370. Angled coupler 330 may thus be formed with an upper member 380A that comprises inner and outer components 383B, 383A, and a lower member 383C (380B), which members including a projection or the like 390 that mates with the slot 70 defined in the rounded projection member 360 of the distal end of an adjoining module, e.g., module 380 or 380' in FIG. 4.

Further, a rounded cavity region 365 is preferably defined within the various coupler members to received the rounded distal end of a module retained within that coupler.

If a straight line portion of a light curtain is required to be longer than the standard length of a main module, several main straight modules may be coupled together using straight couplers such as coupler 310. As shown in FIG. 4, a straight line coupler may comprise upper and lower members, in which the upper member comprises left and right components 397A, 397B, which together with lower member 397C make up the coupler. Components 397A, 397B, 397C are used to surround the rounded distal end of a module to be joined, and are then connected together, e.g., with screws 397 or the like.

It may be desired to provide some standard modules with greater or less granularity (or pitch) of light emitter or detector spacing than other standard main modules. Perhaps some regions of a protected zone will require higher optical resolution than others, for example to detect intrusion of a human finger as opposed to detecting intrusion of a human torso. For example in FIG. 3, main module 280" may require a smaller pitch P5 than module 280, which has a pitch P1. This feature is provided by fabricating some standard modules with greater or lesser granularity. If desired, modules having different pitched light units could be color coded to indicate the pitch resolution. For example, standard modules with a high density of emitters or detectors (for example 14 mm pitch, measured center-to-center from light emitter or light detector mounting) may have one color, whereas lower density modules may have a different color. (It is-understood that "color" refers to the module body, and not to the light emitted by light emitters within the module.)

Referring to FIG. 3 (and FIG. 7A), main straight modules 380, 380' are joined by an angled coupler 320' that defines approximately a 90° bend. Upper and lower members 380A' and 380B' are placed, respectively, above and below distal ends 360', 360" of main modules 280' and 280'. The mechanical interlocking formed by mating vertically projecting ribs (e.g., 390) and slots (e.g., 370) enable members 380A', 380B' to secure modules 280', 280" at an offset angle θ that is here defined by the geometry of coupler 320'. Of course other configurations for rotatably connecting adjoining modules could be provided, preferably while maintaining a constant optical resolution across any intervening joining angle.

As shown in FIG. 3, screws or other joining devices 397 then secure upper and lower members 380A', 380B' together, thereby retaining adjacent modules 280', 280" at the desired bend angle. FIG. 3 does not depict the light units (e.g., light emitters or light detectors) arrayed in the modules but as noted preferably the spaced-apart pitch of the emitters or detectors remains constant through the bend θ. Note that FIG. 3 depicts a straight coupler 395 that may be used to join adjacent main modules, for example to provide a great overall length, or in the embodiment of FIG. 3, to provide a coupling to a cable end module 400. (Module 400 will be described in further detail in conjunction with FIG. 5.)

At the lower right portion of FIG. 4, the coupler comprising members 380A", 380B" may be defined as an end or terminating coupler, e.g., no other coupler or main module is connected through this coupler. As such, proper termination, as necessary, of relevant electrical leads at a distal end of the light curtain may be made within this coupler. (The other distal end of the light curtain will be terminated with the cable end module 400.) The terminating end coupler essentially completes and closes the electrical interconnection paths within the light emitting or light detecting system portion of the light curtain array. In the preferred embodiment, a terminating end coupler will not include any light units.

Although FIG. 4 depicts couplers and main module distal ends that interlock using ribs and slots, those skilled in the mechanical arts will appreciate that other mechanism could instead be used to mate together adjacent main modules, or to mate modules to couplers, at a desired bend angle. However they are joined, adjacent modules will preserve the optical beam resolution through any bend angle, according to the present invention. As will be described further with respect to FIGS. 4–6, continuity of electrical interconnections between main modules is also preserved across intermediate couplers.

The present invention provides a mechanism by which beam optical resolution may be preserved through bends and angles in a light curtain system. The resultant light curtain may be extended in a straight line, for example by inter-coupling main modules with a straight coupler, or may be bent or curved, for example, by inter-coupling main modules with curved or angled couplers. In a practical system, it is understood that if FIG. 4 depicts a light emitting system 220, then there will be a similarly configured (e.g., similar locus) light detecting system 230 spaced apart (perhaps vertically) to preserve parallelism within an acceptable error.

Referring to FIG. 5, a preferred embodiment of a cable end module 400 is shown. Distal end 430 of module 400 is rounded and preferably has the same curvature or radius R as the distal ends of the main modules have. This curvature is sized to fit within the curved cavity regions internal to the various couplers. Note that module 400 may include one (or more) light units 230 or 250. The pitch of such units will preferably be identical to the pitch of light units in an adjoining module. The distance between the distal most light unit (if any) in end module 400 and the distal-most portion of rounded region 430 is such as to preserve granularity or pitch between the adjoining module and module 400. Cable end module 400 brings electrical signals and power into the light emitting or light detecting system, and is also coupled signals from the light emitting or light detecting system to electronics 70 and/or 80. For the light emitting system of a light curtain, electronics 70 and/or 80 will include drive signals for the light emitters. For the light detecting system, electronics 70 and/or 80 will signal process detection signals output by the light detectors. The design and implementation of electronics 70 and/or 80, and of alarm systems and machinery power interrupting circuits, is well known to those skilled in the art of circuit and signal processor design. Accordingly further details of electronics 70/80 are not presented here.

Preferably a user viewable surface of at least one module in the light curtain, e.g., cable end module 400 in FIG. 4, includes at least one indicator 420, for example LED(s). Activation of one or more of LEDs 420 can provide useful information as to operational status of the overall light curtain system. For example, indicator(s) 420 can signal that operating power is present to the system, and that the transmitting or detecting unit to which the indicators are attached appears to be functioning normally. As further shown in FIG. 4, preferably some of the couplers will include a mounting flange 340 or other feature enabling the modular assemblies to be screwed, bolted, or otherwise attached to the regions adjacent the protected zone.

FIG. 6 provides further detail as to a preferred embodiment of an angled coupler 330, comprising upper members (383A, 383B) and lower member (383C). Of course it is understood that members denoted upper and lower could instead be lower and upper. At the time of manufacture, the angled coupler shown in FIG. 6 will be formed with a desired fixed angle θ, for example 60°.

Note that one of the members, here member 383C (or 380B'), includes electrical connection blocks 410. The rounded distal end 360 of a main module (e.g., 280') includes a mating connector 410' (e.g., male if block 410 is female, or vice versa). When the light detecting or light emitting system is assembled, the rounded distal end 360 of a main module is inserted into the rounded region 365 in a coupler. In the embodiment of FIG. 6, the main module is then pushed downward such that there is a mating not only between slots and projecting ribs, but also between connectors 410, 410'. Wiring (not shown) within 380B' interconnects pins between the two connector blocks 410, such that when two main module are mechanically and electrically connected via the coupler, there is electrical interconnection from main module to main module via the connector blocks. Screws or other devices then join together members 380A', 380B' around the distal end of two main module members. If desired, members 380A', 380B' could be fabricated to simply snap together, obviating the need for screws or the like.

Figure 7A:
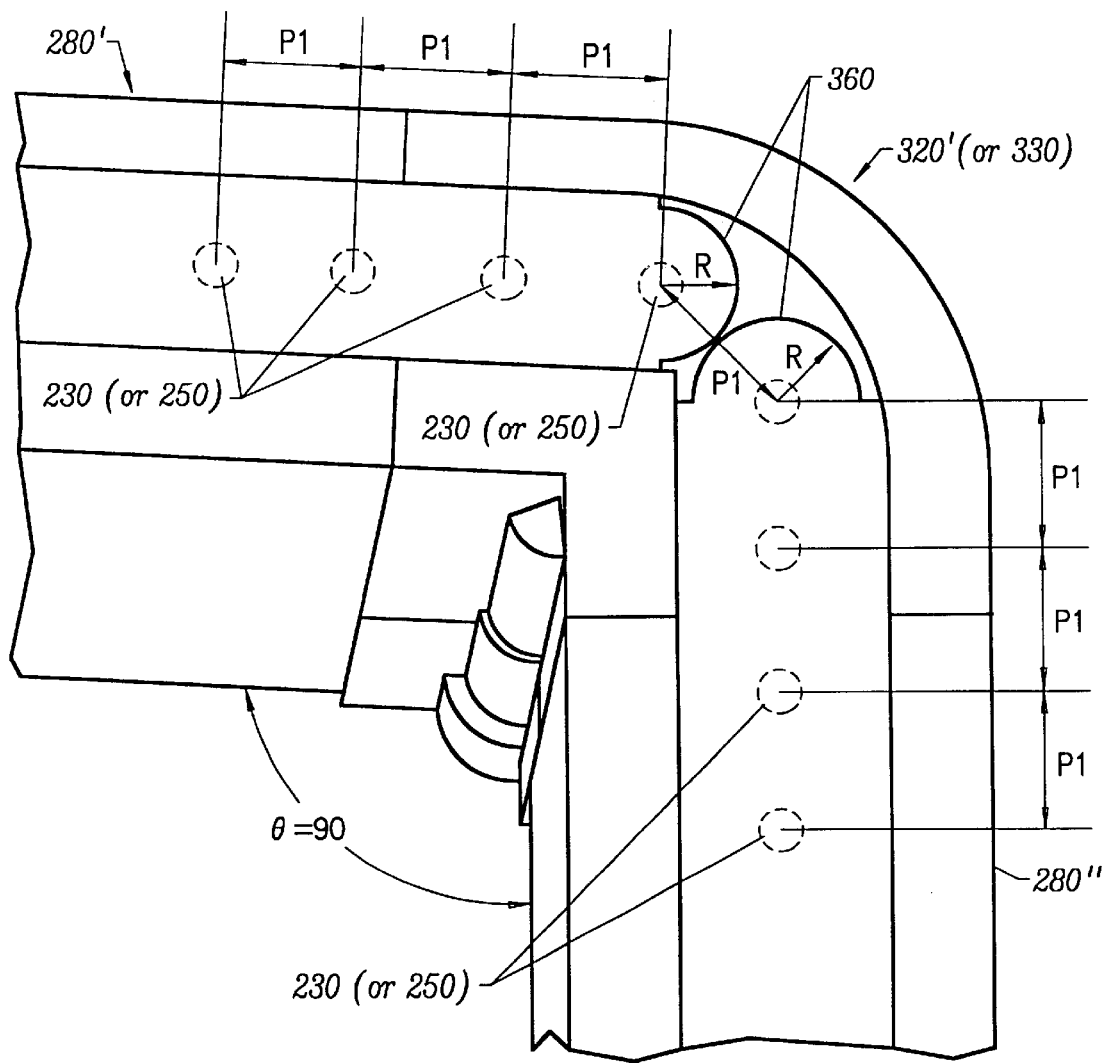
FIG. 7A is a perspective view of a portion of a light curtain depicting adjacent straight modules joined by a 90° angled coupler that preserves optical beam resolution through the angle, according to the present invention.

Turning now to FIG. 7A, straight modules 280', 280" are shown joined by a angled module 330, that provides a fixed θ=90° angle to the overall light emitting or light detecting system 210 (or 220). In this example, a fixed pitch P1 is shown preserved across coupler 320'. Stated differently, the distance between adjacent light emitters 230 (or light detectors 250) is the same, whether measured along the length of a main module, or across the coupler. If the distance between adjacent light emitters/detectors is P1, then the radius R of the curved region 360 of each distal portion of a main module is P1/2, e.g., 2R≦P1. If desired one could instead reduce R such that a different pitch is provided across a coupler.

FIG. 7B is a perspective view of a portion of a light curtain depicting preservation of optical beam resolution through an obtuse angle bend θ1. In FIG. 7B, straight main modules 280, 280' are joined by a fixed obtuse angled coupler 320 (or 330). Magnitude of the angle is determined by the geometry of the curved coupler and will have been manufactured to accommodate the machinery or region to be protected with a light curtain. If the spaced-apart distance P1 between adjacent light emitters or light detectors 230 (250) is P1, then the radius R defining the curved distal portions 360 of the main modules is again made less than or equal to P1/2. In this manner a constant pitch or optical beam resolution is maintained across the obtuse bend.

It will be appreciated from the above description including that of FIGS. 7A and 7B that adjacent main modules are rotatable along an optical radius (e.g., normal to a distal-most light emitter or light detector) such that the spaced-apart pitch between adjacent light emitters or light detectors can be preserved. As noted, this feature enables constant optical resolution to be maintained along the beam curtain. This feature is achieved if the radius R of the rounded distal end of a main module (measured from the center of a distal-most first or last light emitter or light detector) is ≦P1/2, where P1 is the pitch between adjacent light emitters or light detectors.

Figure 8A:
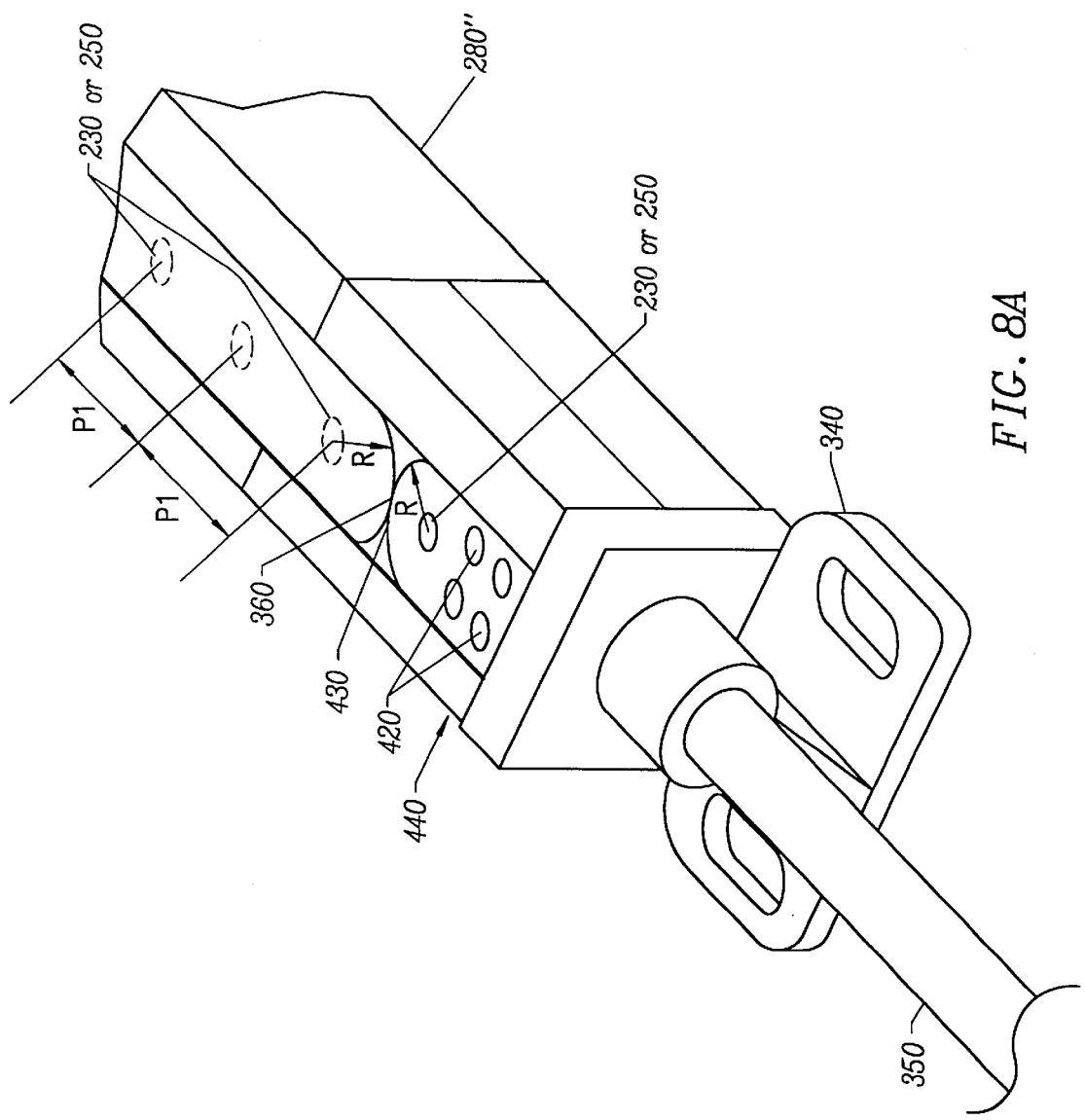
FIG. 8A is a perspective view showing the coupling between a cable end module and an adjacent main module, according to the present invention.

FIG. 8A shows further details of the interface between cable end module 400 and an adjacent main module, here 280". In the end module shown, a light unit 230 (or 250) is disposed a uniform pitch distance P1 away from the nearest light unit 230" (or 250") in the connected main module.

Figure 8B:
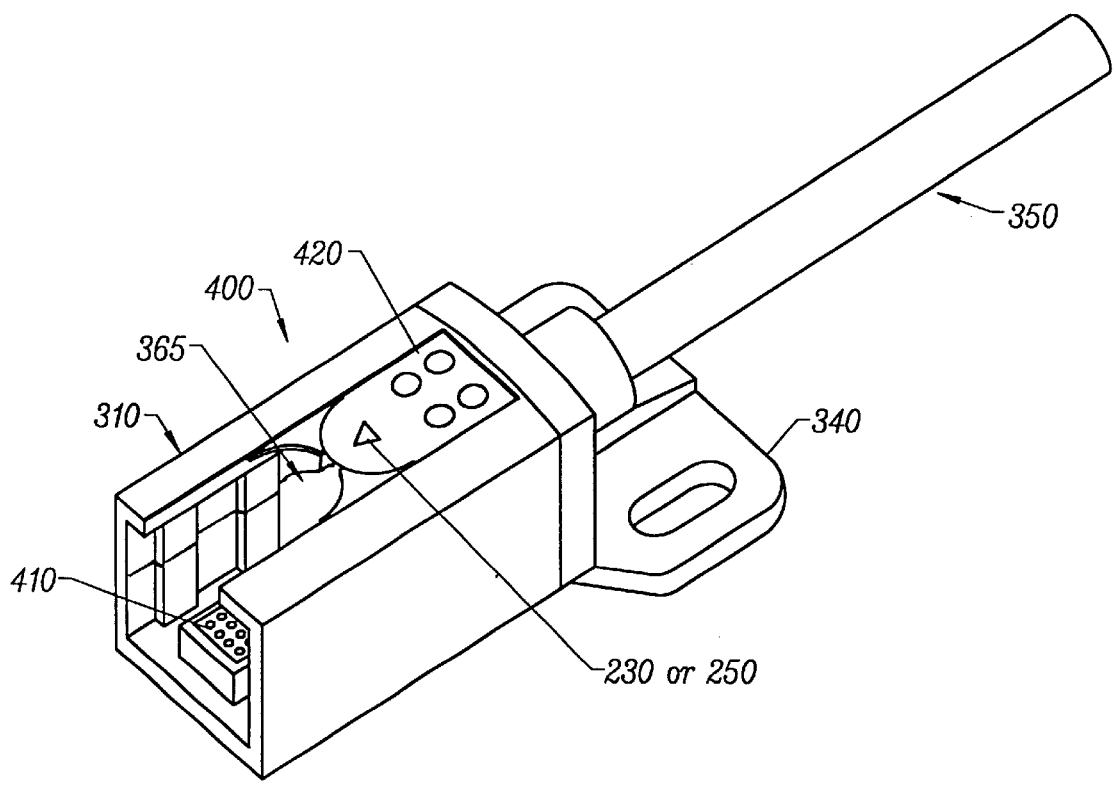
FIG. 8B is a perspective view showing coupling between a straight coupler and a cable end module, according to the present invention.
Figure 8C:
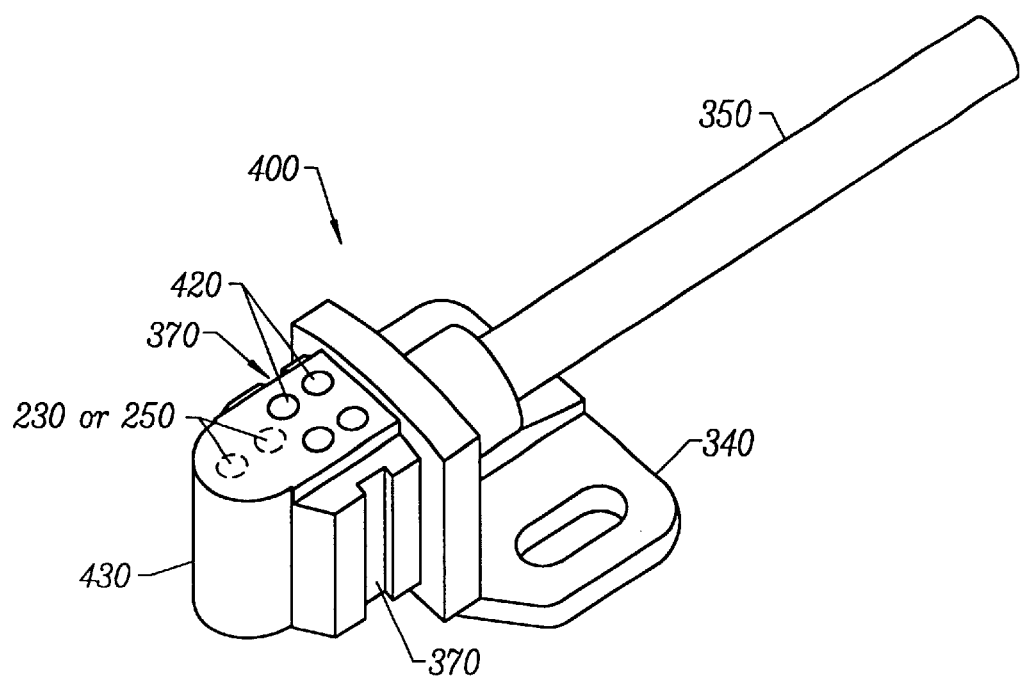
FIG. 8C is a detailed perspective view of the cable end module of FIG. 8B, according to the present invention.

FIG. 8B depicts the interconnection of cable end module 400 and straight coupler 310. FIG. 8B clearly depicts the rounded cavity region 365 sized and shaped to received the projecting rounded distal portion 360 of a module. FIG. 8B also shows a connector block 410 positioned to mate with a connector block in a module inserted into straight coupler 310. In FIG. 8C, cable end module 400 is shown as having been removed from straight coupler 310 (in FIG. 8B). Slot 370 on the rounded distal end of module 400 is also shown. Note that two light units (230 or 250) are shown on end module 400, the pitch distance between these two light units preferably being identical to the pitch on a mating module.

Figure 9A:
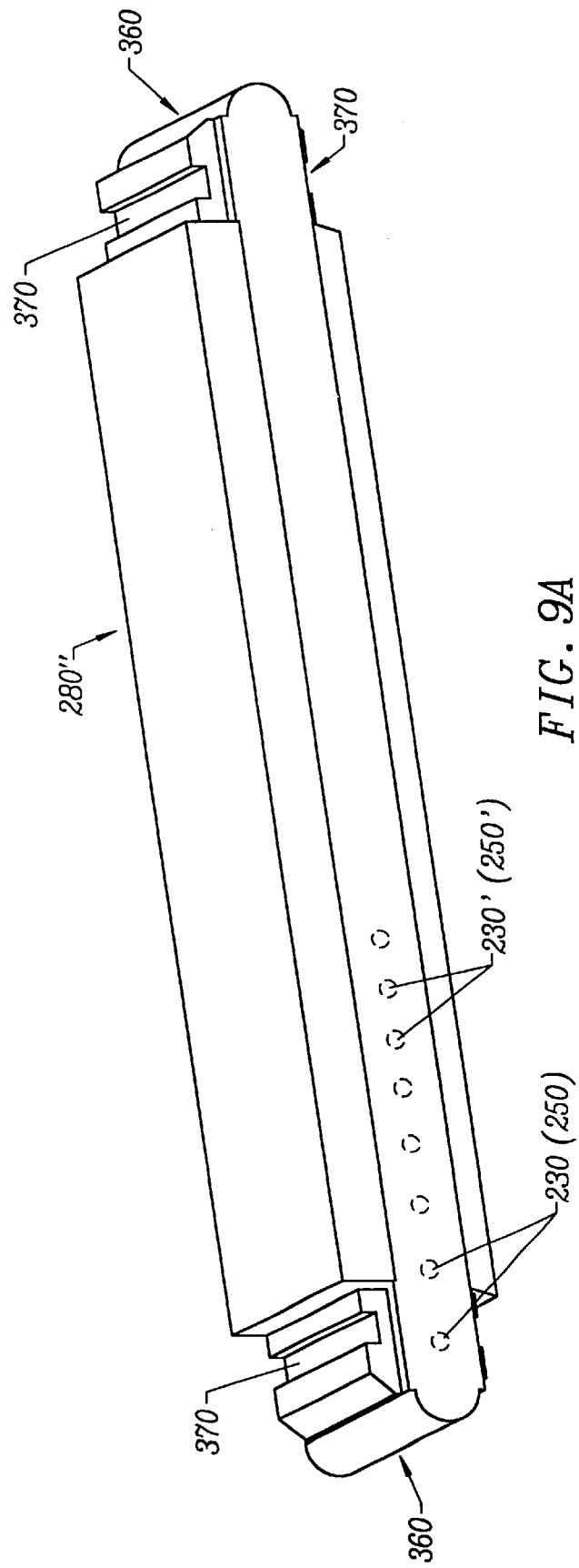
FIG. 9A is side perspective view of a straight module, according to the present invention.

FIG. 9A is a side perspective view of a main module, e.g., 280", and depicts slots 370 formed in each rounded distal end 360. An array of light detectors or emitters (230, 250) are shown. Detectors (or emitters) 230' (250') are intentionally shown as being somewhat staggered in their positioning. As noted earlier, some error in placement of the individual detectors/emitters and indeed in non-parallelism between spaced-apart light emitter systems and light detector systems can be tolerated.

Figure 10A:
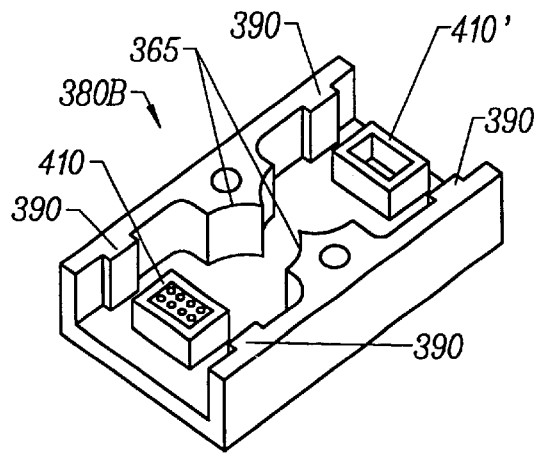
FIG. 10A is a perspective view of a bottom portion of a straight coupler, according to the present invention.

FIG. 9B depicts the interface between a straight module (e.g., 280) and terminating end 380B", for example as shown in perspective at the bottom portion of FIG. 4. FIG. 10A is a perspective view of a bottom member 397C for a straight coupler (see 310 in FIG. 4), and shows the mating electrical connector blocks 410, 410'. Not shown is electrical wiring or leads connecting pins on one of the connector blocks to pins on the other block. FIG. 10A also shown rounded cavity regions 365 sized to retain the rounded distal end of a module whose electrical connector will mate with 410 or 410'.

Figure 10B:
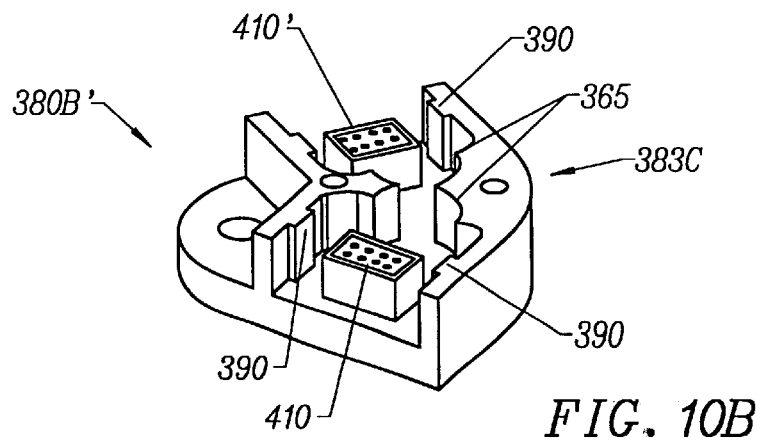
FIG. 10B is a perspective view of a bottom portion of an angled coupler, according to the present invention.
Figure 10C:
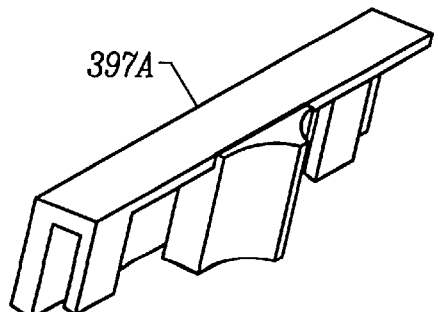
FIG. 10C is a perspective view of one of the two members in a two-member upper portion of a straight coupler, according to the present invention.
Figure 10D:
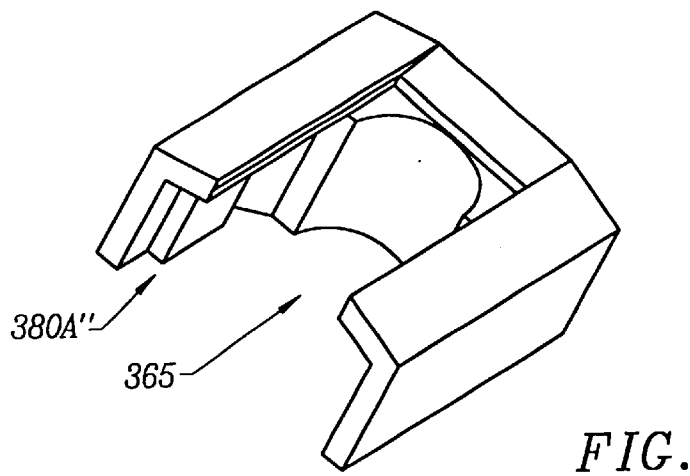
FIG. 10D is a perspective view of an upper member of a terminating end, according to the present invention.
Figure 10E:
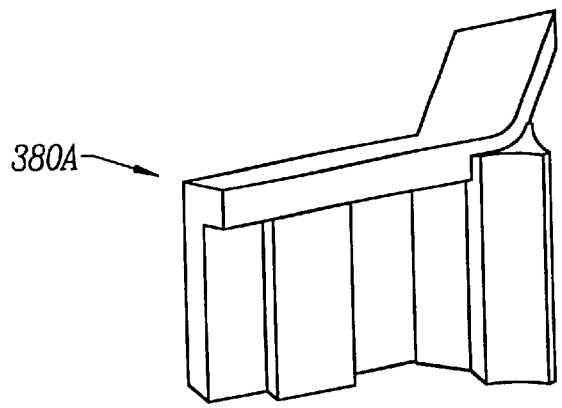
FIG. 10E is a perspective view of the innermost portion of an upper member of an angled coupler, according to the present invention.
Figure 10F:
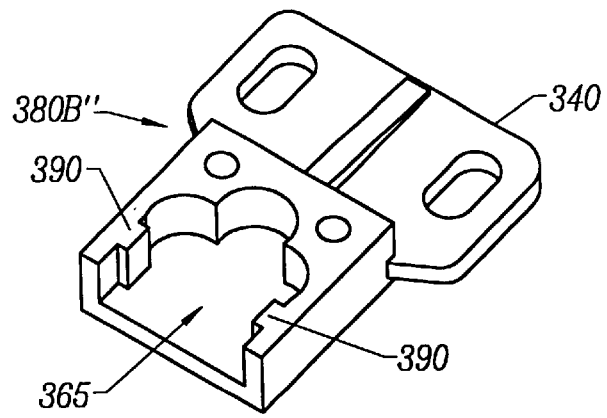
FIG. 10F is a perspective view of the bottom portion of terminating end, according to present invention.

FIG. 10B depicts the bottom member 383C (380B') for an angled coupler such as 330 in FIG. 6 or in FIG. 4. Again the rounded cavity regions 365 and projecting slots 390, and connector blocks 410, 410' used to engage and mate with an adjacent module are shown. FIG. 10C is a perspective view of member 397A, which comprises part of the straight coupler 310 shown in FIG. 4. Again, the presence of a rounded region and projecting rib is seen. FIG. 10D depicts upper member 380A" for a terminating end (see FIG. 4). FIG. 10E is a perspective view of the innermost portion 381A' of an angled coupler, e.g., 330' in FIG. 4. FIG. 10F is a perspective view of the bottom portion of terminating end 380B", as shown in FIG. 4. Again, it is understood that members referred to as upper or bottom may in fact be bottom and upper orientation.

Figure 11B:
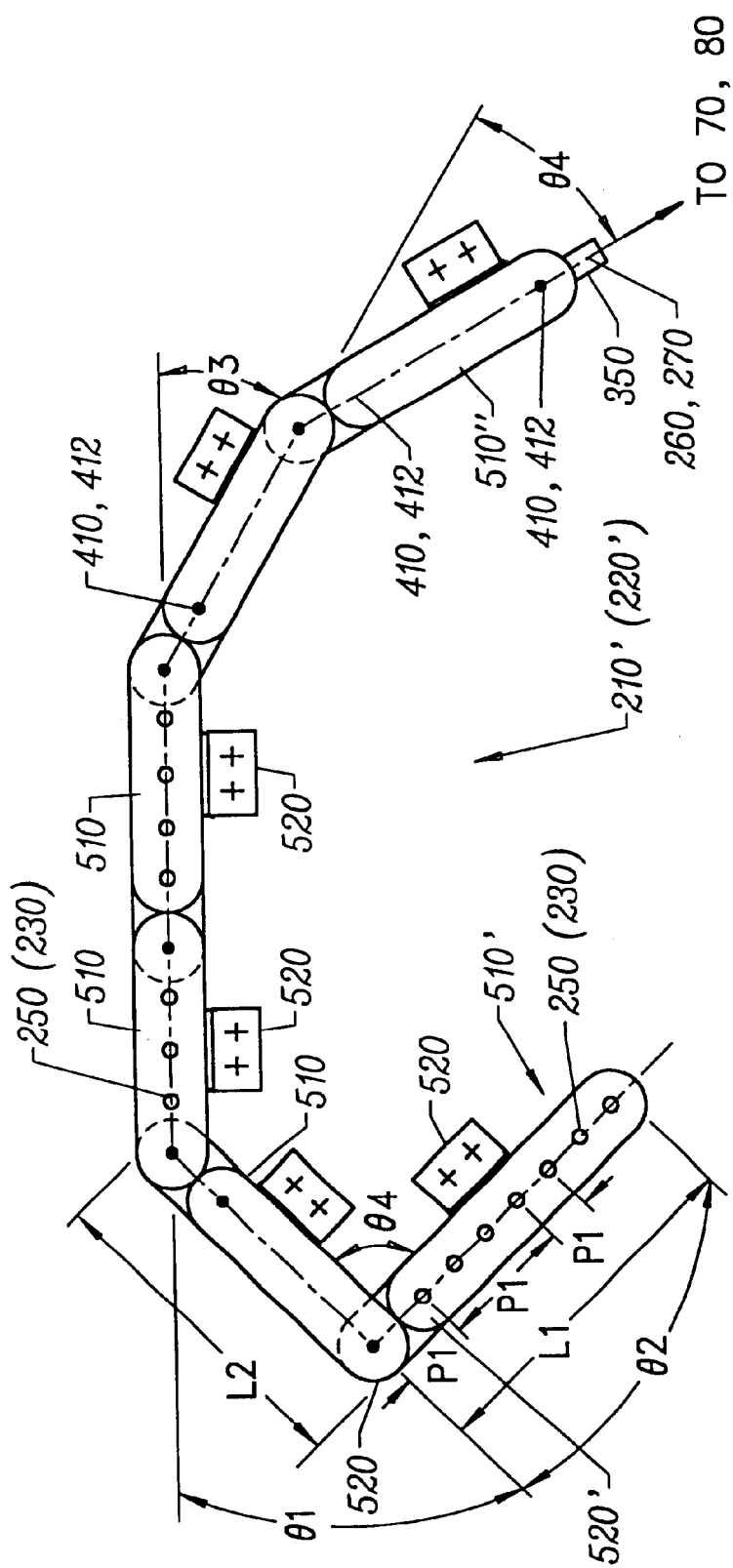
FIG. 11B is a plan view of a portion of a light curtain implemented using the module of FIG. 11A to achieve user variable angular displacement, according to the present invention.
Figure 12:
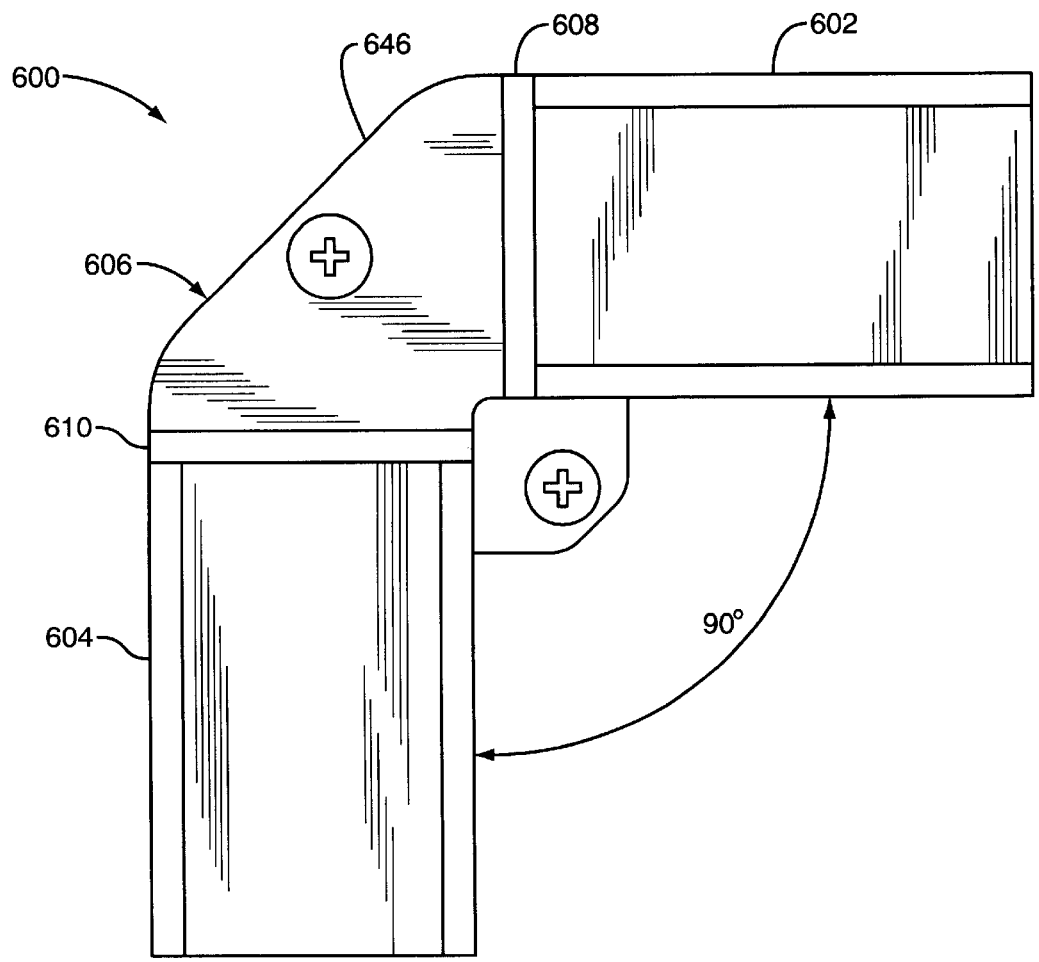
FIG. 12 is a bottom plan view of a coupler assembly for coupling together ends of first and second modules.

FIGS. 11A and 11B will now be described with respect to modules and light emitter systems and light detector systems in which adjacent main modules are modularly and pivotally or swivallably attachable to each other at a desired angle within a range of about ±90° (e.g., 180° overall rotation) without using couplers. This is in contrast to the various embodiments thus far described in which couplers join adjacent modules, and in which a light curtain is provided whose angular displacements (if any) between adjacent main modules are fixed at the time of construction of the angled couplers. However in some applications it may be necessary or desirable to provide an angled portion in a light curtain that is not readily available from angled couplers. The embodiments of FIGS. 11A and 11B are directed to such applications.

FIG. 11A depicts a module 510 that includes an array of spaced-apart light emitters 230 or light detectors 250. In the embodiment shown, adjacent light emitters or light detectors are spaced-apart with a pitch or granularity distance P1. The distal end 520,520' of each module 510 is rounded with a radius R, and includes a preferably rotatable electrical connector 412, 412' that will engage with a mating electrical connector on an adjacent such module. By rotatable it is meant that if adjacent modules are rotated, the connectors will maintain electrical interconnection. Note in FIG. 11A that the connector 412 at one surface of the rounded distal end of the module is on the underside of a ledge 530 that overhangs the flat edge of the lower surface at the module at that end. However on the other rounded distal end of the module, the electrical connector 412' is disposed on an upward facing surface of a rounded ledge 520' that extends beyond the rounded upper surface of the module at that end. As will be described, a connector 412 facing down from one end of a similar module can interconnect with upward facing connector 412' on the module shown in FIG. 11A.

The modules are formed with the geometry shown in FIG. 11A. Thus, if there are a number n light emitters or light detectors along the length of the module, spaced-apart a distance P1, then the overall length L of the module is given by L=nP1+2R for R≦0.5 P1. The radius R of each distal end of the module is sized such that R≦0.5P1. At one distal end 520, the module underside 525 has a rounded ledge 530 that extends a distance 0.5P1, measured to the center of the distal-most light emitter or light detector. In the embodiment of FIG. 11A, electrical coupler 412 is disposed on the underside region 525. In a manner known to those skilled in the art, electrical leads or wires 260 or 270 within housing 540 of module 510 are coupled from pins in connector 412 at one end 520 of module 510, to the light emitters or light detectors 250, 230 on the module, to pins in connector 412' at the other end 520' of the module.

Turning now to FIG. 11B, a light emitting system 210' or a light receiving system 220' is shown as comprising several modules 510, 510', 510" that are interconnected together and swivelled through an arbitrary angular offset. If system 210' is a light emitting system, then modules 510, 510', etc. will include an array of light emitters 230, spaced apart from each other by a pitch distance P1. If system 220' is a light detecting system, then the modules will carry light detectors 250 rather than light emitters, and the light detectors will be arrayed with a spaced-apart pitch distance P1. In FIG. 11B, a light emitter system or light detector system is shown comprising six (n=6) modules, such as shown in FIG. 11A. As indicated in FIG. 11B, different modules may have different lengths, e.g., L1 need not be equal to L2, and so forth. It is understood, of course, that a system 200 providing a light curtain such as curtain 240 in FIG. 2 will include a spaced-apart (typically vertically spaced-apart) light emitting system 210' and light detecting system 220', in which systems 210' and 220' preferably comprising groupings that include modules such as module 510 shown in FIG. 11A.

The module geometry noted in FIG. 11A is such that pitch distance P1 is maintained between adjacent modules. Thus in FIG. 11B, module 510 and module 510' are swivallably coupled together and offset, relative to one another, by an angle θ, for example perhaps 90°. In the plan view shown, distal most end portion 520 of module 510 overlaps and sits atop the distal most ledge end portion 520' of module 510'. It is understood that swivel connectors such as 412, 412' (see FIG. 11A) matingly engage with each other, e.g., a connector attached to a bottom-facing surface of module 510 engages a connector attached to a top facing surface of module 520' in FIG. 11B). One or both of the mating connectors may be partially recessed within the associated module. In this manner, electrical and mechanical interconnection is made between adjacent modules, while permitting the two modules thus coupled to swivel or pivot through almost any angle 0°≦θ≦180°, as dictated by the desired perimeter of the light curtain.

Termination modules are preferably provided at the distal end of a light emitting or light detecting system. Thus end module 510' in the coupled-together string of modules will provide termination for the electrical leads 260, 270 carried from module-to-module via rotatable connectors 410, 412. Similarly at the other terminus of the module string, module 510" will provide coupling to electronics 70, 80.

Thus a technician installing a light curtain (e.g., curtain 240 in FIG. 2) comprising spaced-apart light emitter system 210' and light detector system 220' around machine 10, such as shown in FIG. 2, can provide a required angle θ at the job site. Once the angle is attained, flanges or other mechanisms 520 may be used to secure the modules to a working surface (e.g., surface 55 in FIG. 2) or surface on a machine to be protected (e.g., machine 10 in FIG. 2). The ability to thus form a customized light curtain whose locus may include various angles (e.g., θ, θ1, θ2, etc. in FIG. 11B) shortens installation time, and can greatly reduce installation cost, since the light curtain is modular and can be implemented with standard interlocking components. If desired modules such as shown in FIGS. 11A and 11B could be formed to mate with modules and/or couplers such as shown in FIG. 6, for example, to enhance flexibility in implementing a desired light curtain shape. Thus if it is known that certain angles in the desired light curtain will be fixed, fixed couplers/modules may be used to implement such portions of the light curtain.

In summary, however implemented, e.g., with fixed angled or curved couplers, with main modules, or with pivotable modules, electrical and mechanical interconnections are secured made in a fashion that preserves pitch of the light emitters or light detectors, across curved, angled, or straight regions of the light curtain. Further, different pitch granularities (or optical resolution) may be provided, if desired, for different regions of the light curtain by coupling modules whose light emitters or light detectors have a different pitch than pitch in other regions. Light curtains of varying loci may be implemented using modular components, e.g., modules and/or couplers, that snap or otherwise interlock together.

It is thus seen that the present invention fulfills the shortcomings of prior art light curtains. In a typical industrial application, light emitters in a light curtain are triggered sequentially (e.g., by electronics 70 and/or 80). However the details of light emitter activation, or of light detector signal processing are relatively unimportant with respect to the various embodiments of the present invention. For example, in a consumer application, a light emitting system according to the present invention may be used to present a modular articulated source of visible light that is not necessarily sequenced. Systems that emit visible light with a 100% duty cycle (e.g., always on) or a sufficiently high duty cycle to reduce flicker could be used in lieu of conventional ceiling mounted track lighting units. Thus, a light emitter system such as shown in FIG. 11B might be attached to a ceiling in a room to provide room lighting. FIGS. 12–18 illustrate another embodiment providing a coupler assembly 600 for coupling together the ends of adjacent modules 602, 604 in a light curtain system. This embodiment is appropriate for mounting the modules at a 90° included angle. As explained below, with the use of interchangeable corner blocks, the invention enables the modules to be mounted at other included angles, such as 120°, 150° or 180°.

Figure 13:
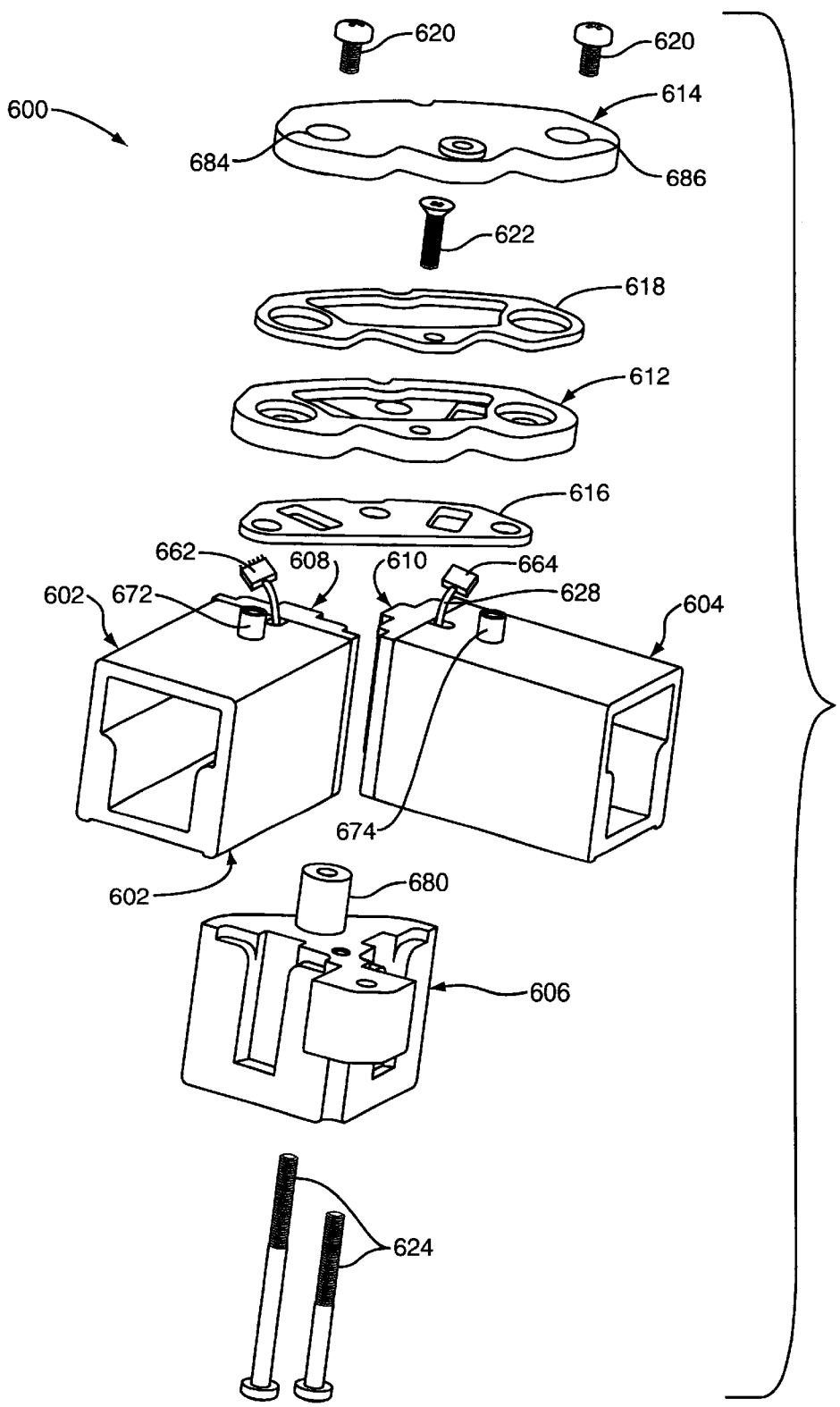
FIG. 13 is an exploded perspective view, to a reduced scale, of the coupler assembly of FIG. 12.

The components of coupler assembly 600 are illustrated in the exploded view of FIG. 13 and comprises a corner block 606, a pair of end caps 608, base plate 612, cover 614, gaskets 616, 618, fasteners 620, 622 for mounting the components in assembled relationship, and fasteners 624 for mounting the assembly to a wall, floor, frame or other structure.

The coupler assembly of the invention is adapted for use with conventional light curtain modules. This enables a user to disassemble a previous purchased light curtain and then reassemble the existing modules with one or more of the coupler assemblies of the present embodiment. The user can also reassemble the modules with a desired angular orientation by selecting the appropriately configured corner block 606 in each coupler assembly. The invention further enables a user to change the angular orientations of adjacent modules from time-to-time by replacing the corner blocks. The assembly and the disassembly can be carried out rapidly and with little inconvenience using conventional tools.

Figure 16:
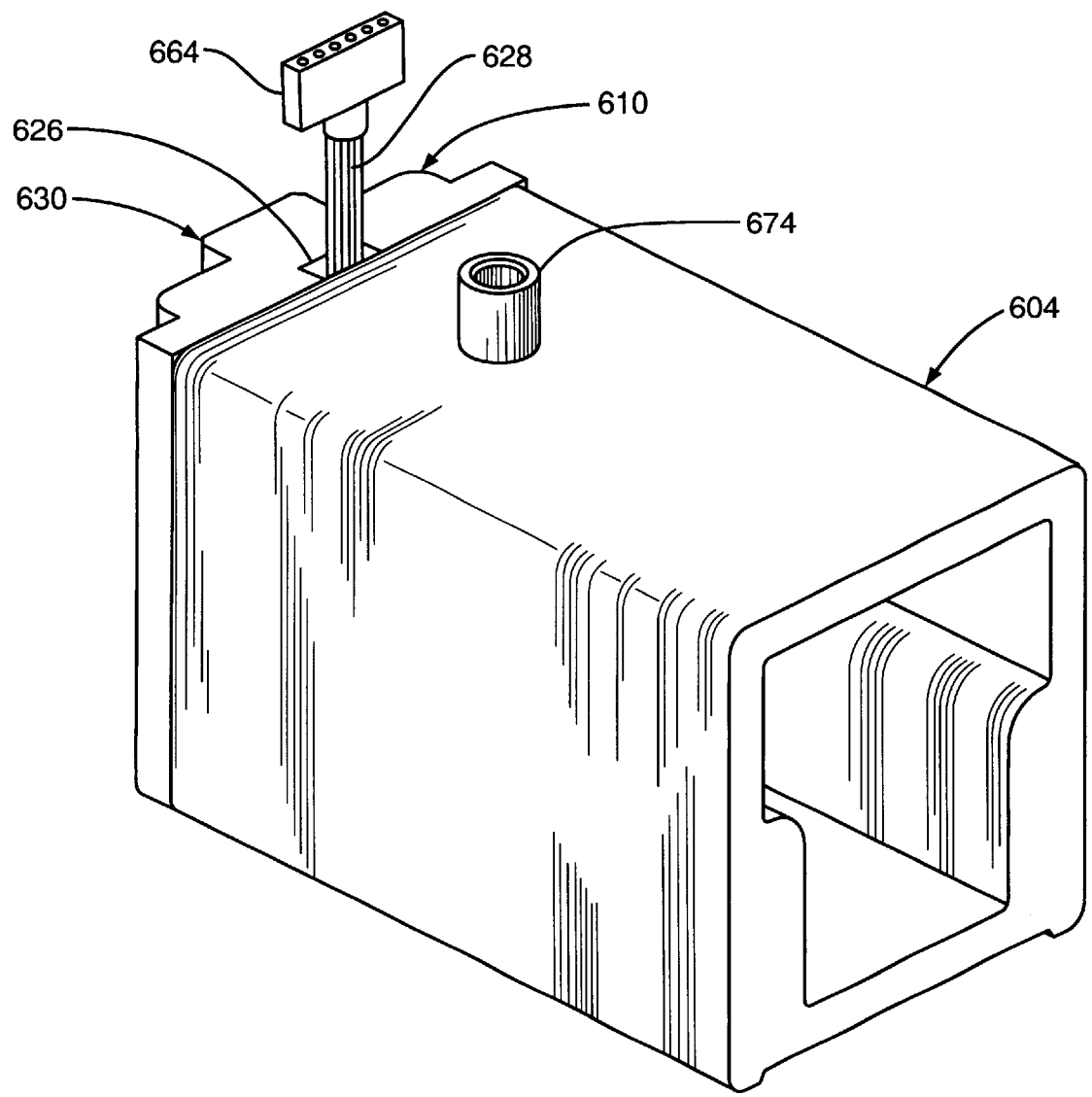
FIG. 16 is a perspective view from a top angle of the end cap shown in FIG. 15.

Each of the end caps 608, 610 are connected at one end with an end of a respective module. As best shown in FIG. 16 for the typical end cap 610, the leads or wires 628 which direct electrical signals from the external control system, not shown, extend from inside the module and out through a notch 626 in the end cap. Preferably the end cap outer perimeter has a cross-sectional shape commensurate with that of the module.

Figure 14:
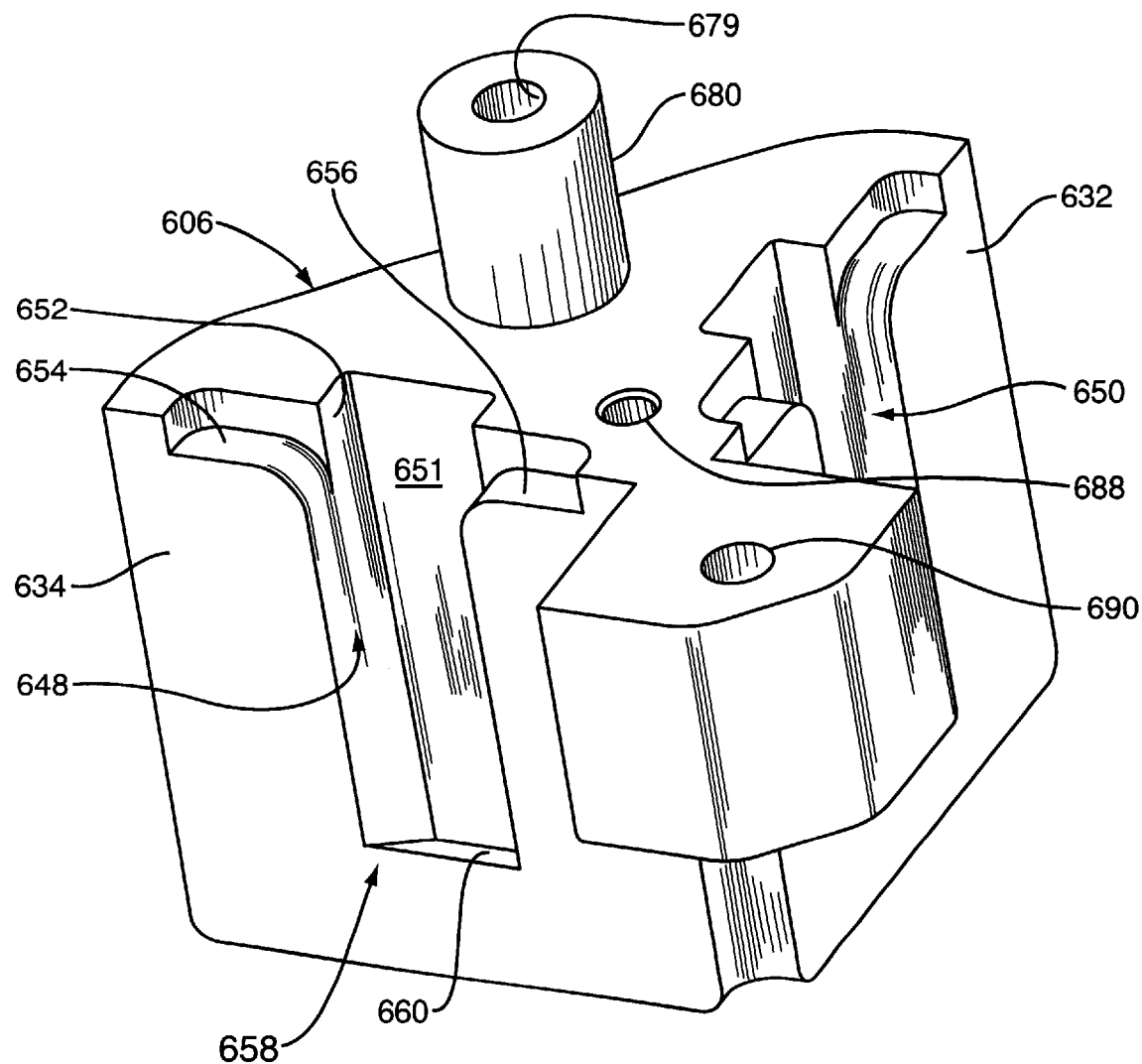
FIG. 14 is a perspective view to an enlarged scale of a corner block which is a component assembly of FIG. 13.
Figure 15:
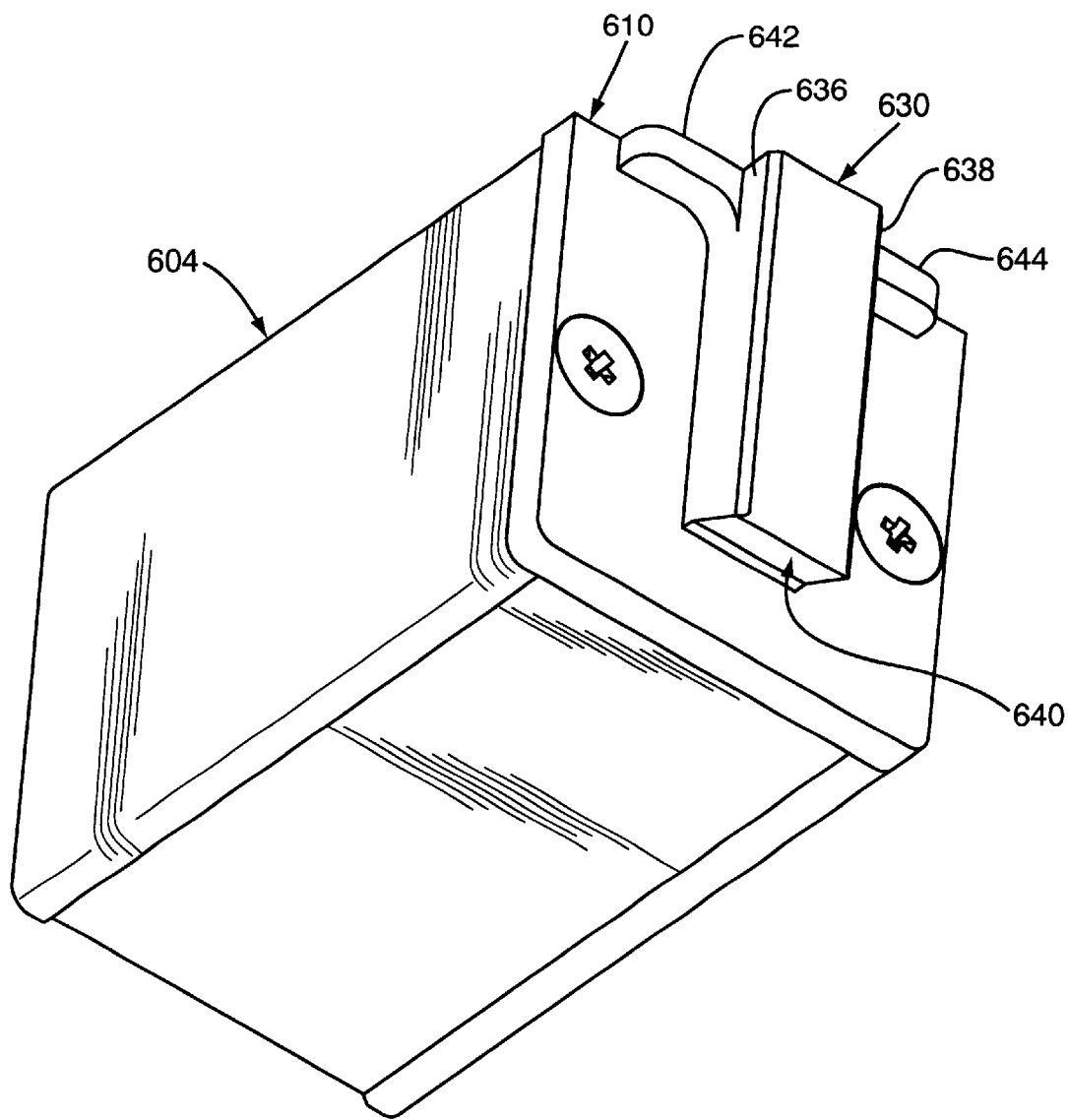
FIG. 15 is a perspective view from a bottom angle and to an enlarged scale of an end cap which is a component of the assembly of FIG. 13.

As best shown in FIGS. 15 and 16, the typical end cap 610 is formed with a mounting structure 630 which is shaped for releasable engagement with one side or face 632 of corner block 606 (FIG. 14) in a manner to be described. The other end cap 608 is also formed with a similar mounting structure which is shaped for engagement with another side 634 of the corner block.

The structural details and function of the mounting structures will be explained in detail in regard to the typical mounting structure 630 of end cap 610 (FIG. 15). The mounting structure comprises a ridge 636, preferably rectangular in cross-section, formed on the outer side of the end cap. The ridge forms a flat surface 638, and the bottom end of the ridge is formed with a surface 640 with inclines out and toward the bottom as viewed in FIG. 15 so as to form a wedge. At the opposite end of the plate, a pair of outwardly directed shoulders 642, 644 are formed on opposite sides of the ridge.

Corner block 606 is illustrated in detail in FIG. 14. The two adjacent sides 632, 634 can be releasably mounted on respective end caps 610 and 608. The corner block has a generally triangular horizontal cross-section with an outer side 646 (FIG. 12) which is flat. Other configurations for the corner block could be provided, such as with a square or other polygonal horizontal cross-sectional shape.

The inner adjacent sides 634, 632 of the corner block are formed with respective seat structures 648, 650 for releasably connecting with the mounting structures on the end caps of respective modules. For the 90° orientation of the modules of FIG. 12, the corner block sides upon which the seat structures are formed are at a 90° included angle.

The typical seat structure 648 comprises an upstanding flat surface 651 formed by a groove 652 having a cross-section which is commensurate with the cross-sectional shape of the end cap mounting structure, which is shown as rectangular. The corner block side 634 is also formed with a pair of recesses 654, 656 on opposite sides of the groove, and these recesses are commensurate in size and shape to that of end cap shoulders 642, 644. A V-shaped cavity 658 is formed at the lower end (as viewed in FIG. 14) of groove 652 by means of an upwardly and outwardly inclined surface 660. This V-shaped cavity is sized and shaped commensurate with that of end cap wedge 640.

The two seat structures of the corner block are fitted into assembly relationship with the mounting structures on the end caps so as to rigidly and securely connect the modules together. This can be easily accomplished by the relative sliding movement of ridge 636 into the groove of seat structure 650 with the flat surface of the mounting structure sliding along the flat surface of the groove until the wedge is firmly pushed against the bottom of the V-shaped cavity. After base plate 612 and cover 614 are assembled as described below, the end cap and module to which it is attached are captured against movement relative to the corner block. Each end cap can then be removed for replacement by disassembling the cover and base plate to enable the mounting structure ridge to be moved up along the groove and release the wedge from the V-shaped cavity 658.

As illustrated in FIG. 16, electrical signal leads 628 extend from within the end caps out through openings 626 where they are terminated by micro-connectors 662, 664. One of the connectors is male and the other is female so that the two can be snapped together for establishing electrical circuits along the leads.

Figure 17:
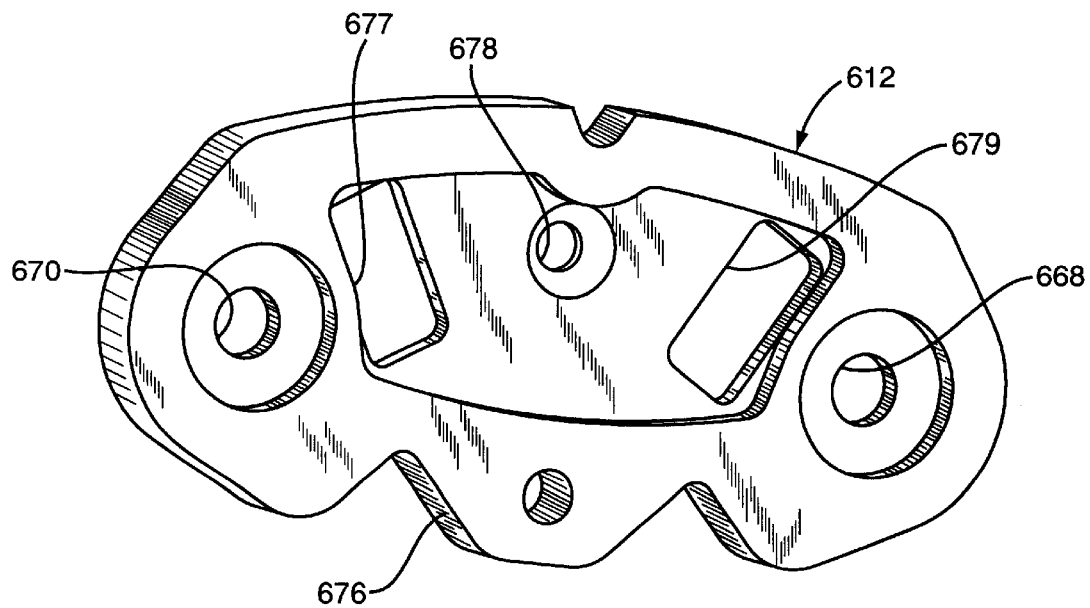
FIG. 17 is a perspective view to an enlarged scale of the base plate which is a component of the assembly of FIG. 13.
Figure 18:
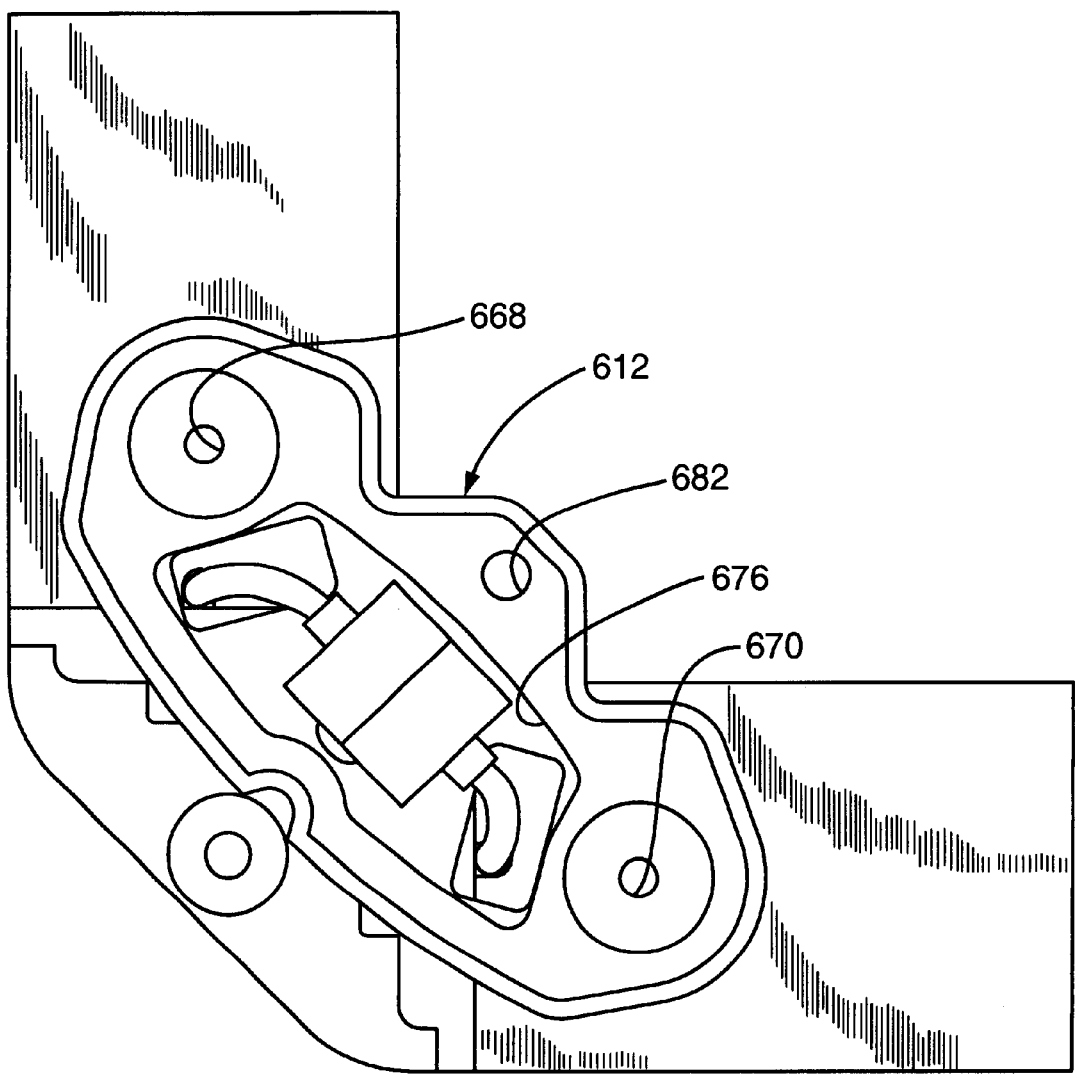
FIG. 18 is a top plan view of the corner assembly of FIG. 12 showing the cover removed.

Base plate 612 is illustrated in detail in FIGS. 17 and 18 and functions to provide rigidity between adjacent end caps and also to house and protect the micro-connectors after they are assembled. The base plate has a generally flat body 666 formed at opposite ends with vertically axised holes 668, 670. The base plate ends are adapted for fitting over the stand-off bosses 672, 674 which are formed on the tops of respective modules 602, 604, as best shown in FIG. 16. A cavity 676 defined by a recess formed in the top of the base plate is sized sufficient to contain the assembled connectors after the cover is in place. A pair of windows 677, 679 formed through the recess enable ingress of the micro-connectors into the cavity. At the center of the recess, an opening 678 is formed which is aligned with a threaded hole 674 in an upstanding boss 680 on the corner block. Opening 682 on one side receives a mounting fastener 624.

Cover 614 is formed with an outer perimeter shape commensurate with that of the base plate. A pair of openings 684, 686 are formed on opposite ends of the cover for receiving fastener 620.

The components of coupler assembly 600 are assembled together by sliding the mounting structures of both end caps down into the respective seats of the corner block. The micro-connectors with attached leads are then threaded up through openings in lower gasket 616 and the windows 677, 679 in the base plate. Fastener 622 is then screwed down through base plate opening 678 and into the opening in the corner block boss 680. The micro-connectors are then connected together and nested down into base plate cavity 676, as shown in FIG. 18. Upper gasket 618 and cover 614 are then placed over the base plate and secured by fasteners 620.

A pair of parallel openings 688, 690 are formed through the corner block (FIG. 14) for purposes of mounting the connector assembly to the desired wall, floor, frame or other structure. Threaded bolts 624 (FIG. 13) are inserted through the corner block openings for this purpose.

Figure 19:
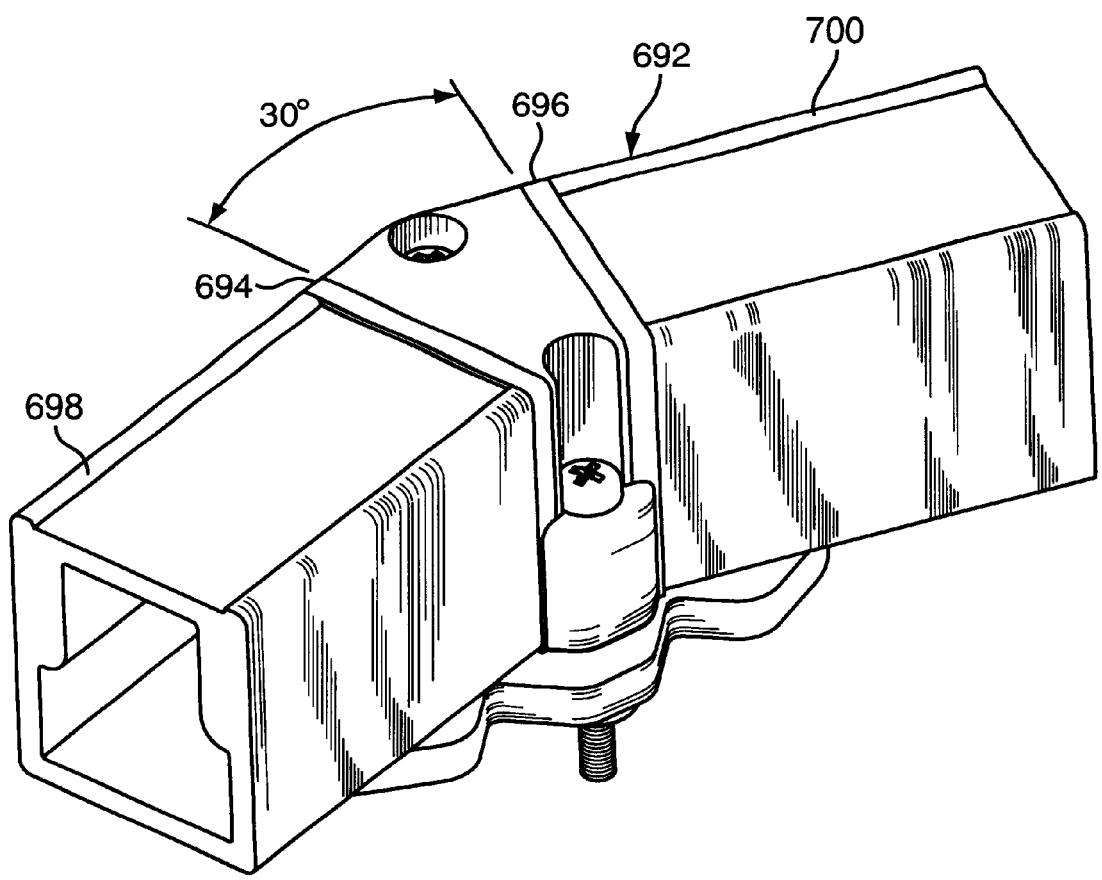
FIG. 19 is a perspective view of a coupler assembly in accordance with another embodiment providing a 150° included angle between modules.

The coupler assembly can be disassembled by reversing the foregoing steps. When it is desired to reconfigure the light curtain with a different angular relationship between the modules, the 90° end cap can be replaced with another end cap of similar construction but in which the adjacent sides forming the seat structures are at a different angular orientation. FIG. 19 illustrates such an embodiment providing a corner block 692 for mounting a pair of end caps 694, 696 and respective modules 698, 700 at a 150° included angle. For this purpose, the corner block sides having the seat structures diverge apart at an angles of 30°. Other examples would be where the corner block sides are parallel for holding the light modules at a 180° orientation, or where the sides diverge at a 60° angle for holding the modules at a 120° orientation.

Replacement of the corner block is simple and fast to accomplish in that it is only required to unscrew the fastener 620 to remove cover 614 which gives access to unscrew center fastener 622 for removing the corner block. The replacement corner block can then be installed.

Modifications and variations may be made to the disclosed embodiments without departing from the subject and spirit of the invention as defined by the following claims.

What is claimed is:

1. A coupler assembly for coupling together ends of first and second modules in a light curtain system, each module having spaced-apart light units operable responsive to electrical signals from a control system directed through at least one lead extending along the modules and having at least one connector end, the coupler assembly including a corner block comprising at least one seat structure having a shape sized to engage with and position the first and second modules along respective axes that diverge at a given included angle, a base plate mounted on the corner block, and the at least one connector end carried by the base plate and intercoupled to electrically connect the at least one lead when the modules are engaged by the seat structure.

2. A coupler assembly according to claim 1, wherein said base plate defines a cavity sized to contain a pair of connector ends.

3. A coupler assembly according to claim 1, further including a cover mountable on said base plate and including a cover portion extending over said cavity to cover the connector ends.

4. A coupler assembly according to claim 1, wherein said included angle is selected from a group consisting of 90°, 120°, 150° and 180°.

5. A coupler assembly according to claim 1, further including an end cap mountable on an end of at least one of the modules, the end cap comprising a mounting structure shaped for engagement with said seat structure.

6. A coupler assembly according to claim 5, wherein said end cap defines an opening, said base plate includes a window that opens from said cavity, the window being in registration with the opening, and wherein at least one connector end extends through the opening and window into the cavity.

7. A coupler assembly according to claim 5, wherein said seat structure of the corner block is shaped for releasable engagement with the mounting structure of the end cap.

8. A coupler assembly according to claim 7, wherein said seat structure comprises a first flat surface, and the mounting structure comprises a second flat surface, the first surface fitting in face-to-face relationship with the second surface and with the end cap enabled for relative linear sliding movement with respect to the corner block.

9. A coupler assembly according to claim 8, wherein the first and second surfaces enable the linear sliding movement to be orthogonal with respect to axes of the modules.

10. A coupler assembly according to claim 5, further including a locking structure to releasably lock the end cap with the corner block.

11. A method for implementing a modular articulated light curtain, comprising the following steps:

(a) providing at least first and second modules, each module having a first rounded distal end including a first electrical connector providing first connections, a second rounded distal end including a second electrical connector providing second connections, and a length therebetween, and a module surface upon which is disposed an array of light units spaced-apart from each other with a pitch P1, said light units being selected from a group consisting of (a) light emitters, and (b) light detectors;

(b) providing a coupler having a first distal end defining a cavity sized to receive at least a portion of said first rounded distal end of said first module and including a first electrical connector having first connections sized to mate with said first connections provided by said first electrical connector, said coupler further having a second distal end defining a cavity sized to receive at least of portion of said second rounded distal end of said second module and including a second electrical connector having second connections sized to mate with said second connections provided by said second electrical connector; and (c) providing on said coupler a light unit that is equi-spaced between a closest adjacent light unit on a distal end of said first and second modules.

12. The method of claim 11, wherein step (a) includes selecting a module having a shape selected from a group consisting of straight, curved, and angled.

13. The method of claim 11, wherein step (a) includes:
providing said first distal end with a first electrical connector, providing said second distal end with a second electrical connector, and electrically coupling at least some connections on said first electrical connector to said light units to at least some connections on said second electrical connector; and
coupling electrical signals to and from at least said first electrical connector.

14. The method of claim 11, wherein step (b) includes providing said coupler with a shape selected from a group consisting of straight, and angled.

15. The method of claim 11, further including maintaining said pitch P1 between a distal-most located light unit on said first module and an adjacent-most distal-most located light unit on said second module.

16. The method of claim 11, further including:
providing a first and second light system, wherein light units in said first light system are light emitters and wherein light units in said second light system are light detectors; and
spacing-apart said second light system from said first light system such that light emitted by at least one light emitter in said first light system is detectable, absent an intruding object, by a light detector in said second light system.

17. A method of implementing a light curtain coupleable to electronics providing operating power and drive signals and providing analysis of signals output by the light curtain, the method comprising the following steps:
providing a light emitting system that defines a locus and includes:
a first module having a first rounded distal end, a second rounded distal end, and a length therebetween, and including on a surface of said first module an array of light emitters spaced-apart from each other with a pitch P1;
said first distal end including a first electrical connector providing first connections, said second distal end including a second electrical connector providing second connections, and providing at least one lead electrically coupling at least some said first connections on said first electrical connector to said light units to at least some said second connections on said second electrical connector;
a second module having a first rounded distal end, a second rounded distal end, and a length therebetween, and providing on a surface of said second module an array of light emitters spaced-apart from each other with a pitch P1;
said first distal end including a first electrical connector providing first connections, said second distal end including a second electrical connector providing second connections, and further including at least one lead electrically coupling at least some said first connections on said first electrical connector to said light emitters to at least some said second connections on said second electrical connector;
disposing a coupler to receive and retain said first rounded distal end of said first module and said first rounded distal end of said second module, said coupler including a first electrical connector to make electrical connection with said first electrical connector on said first module, and including a second electrical connector to make electrical connection with said first electrical connector on said second module, said coupler maintaining said pitch P1 between adjacent ends of said first and second module;
providing a light detecting system, spaced-apart from said light emitting system, also defining said locus; and
coupling electrical signals to and from said light emitting system and said light detecting system.

18. The method of claim 17, including selecting said first module from a group consisting of (a) a straight module, (b) a curved module, and (c) an angled module.

19. The method of claim 17, including selecting said coupler from a group consisting of (a) a straight coupler, and (b) an angled coupler.

20. The method of claim 17, further including providing a third module having a first rounded distal end having curved radius R, a second rounded distal end having curved radius R, and a length L therebetween;
disposing a plurality equal to a number n of light units on a first surface of said third module a common distance P1 apart from each other, and selecting said light units from a group consisting of (a) light emitters, and (b) light detectors;
said first surface of said third module at said first rounded distal end defining a curved ledge with radius $R \leq P1/2$ overhanging an edge of a second surface of said third module, said second surface of said third module defining a base having radius $R \leq P1/2$ extending beyond a second rounded distal end of said first surface;
disposing a first electrical connector to make first connections beneath said curved ledge at said first rounded distal end;
disposing a second electrical connector to make second connections on said base extending from said second surface; and
electrically coupling at least some said first connections on said first electrical connector to said light units to at least some said second connections on said second electrical connector.

21. A method of implementing a modular coupler for use in a modular articulated light curtain, the method comprising:
providing a module having a first rounded distal end having curved radius R, a second rounded distal end having curved radius R, and a length L therebetween;
disposing a plurality equal to a number n of light units on a first surface of said module a common distance P1 apart from each other, and selecting said light units from a group consisting of (a) light emitters, and (b) light detectors;
first surface of said module at said first rounded distal end defining a curved ledge with radius $R \leq P1/2$ overhanging an edge of a second surface of said module, said second surface of said module defining a base having radius $R \leq P1/2$ extending beyond a second rounded distal end of said first surface;
disposing a first electrical connector making first connections beneath said curved ledge at said first rounded distal end;
disposing a second electrical connector making second connections on said base extending from said second surface; and
electrically coupling at least some said first connections on said first electrical connector to said light units to at least some said second connections on said second electrical connector.

22. The method of claim 21, wherein said module is provided with said length L=nP1+2R.

23. The method of claim 21, wherein distance from a center of one of said first electrical connector and said second electrical connector to center of a distal-most disposed light unit is P1.

24. A method of providing a modular articulated light curtain coupleable to electronics providing operating power and drive signals and providing analysis of signals output by the light curtain, the method comprising:

providing a light emitting system that defines a locus and includes:

first and second modules each having a first rounded distal end having curved radius R, a second rounded distal end having curved radius R, and a length L therebetween;

disposing a plurality equal to a number n of light emitters on a first surface of each said module a common distance P1 apart from each other;

said first surface of each said module at said first rounded distal end defining a curved ledge with radius R≦P1/2 overhanging an edge of a second surface of said module, said second surface of said module defining a base having radius R≦P1/2 extending beyond a second rounded distal end of said first surface;

disposing a first electrical connector making first connections beneath said curved ledge at said first rounded distal end;

disposing a second electrical connector making second connections on said base extending from said second surface;

each of said first and second modules including electrical connection between the first and second connectors on a module and including electrical connection to said light emitters;

wherein a distal end of each of said modules is connectable-together using mating said electrical connectors to maintain said distance P1 from module to module, while allowing a desired angle between connected-together said modules to be achieved;

providing a light detecting system, spaced-apart from said light emitting system, also defining said locus; and coupling electrical signals to and from said light emitting system and said light detecting system.

25. The method of claim 24, wherein said first module has said length L=nP1+2R.

26. The method claim 24, wherein said light detecting system is further provided with a plurality of modules identical to the first and second modules except that light detectors are substituted for light emitters.

* * * * *